(12) United States Patent
Okita

(10) Patent No.: US 10,768,495 B2
(45) Date of Patent: Sep. 8, 2020

(54) DISPLAY DEVICE HAVING A FIRST ELECTRODE WITH AN OPENING OVERLAPPING WITH A SECOND ELECTRODE

(71) Applicant: Japan Display Inc., Minato-ku (JP)

(72) Inventor: Mitsutaka Okita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 26 days.

(21) Appl. No.: 15/907,467

(22) Filed: Feb. 28, 2018

(65) Prior Publication Data

US 2018/0252974 A1    Sep. 6, 2018

(30) Foreign Application Priority Data

Mar. 3, 2017 (JP) ................. 2017-040032

(51) Int. Cl.
| | |
|---|---|
| G02F 1/1362 | (2006.01) |
| G02F 1/1343 | (2006.01) |
| G02F 1/1333 | (2006.01) |
| G02F 1/1368 | (2006.01) |
| G02B 27/01 | (2006.01) |

(52) U.S. Cl.
CPC ...... *G02F 1/136286* (2013.01); *G02F 1/1368* (2013.01); *G02F 1/133345* (2013.01); *G02F 1/134309* (2013.01); *G02F 1/136209* (2013.01); *G02F 1/136227* (2013.01); *G02B 27/017* (2013.01); *G02F 2001/134318* (2013.01); *G02F 2001/134345* (2013.01);

(Continued)

(58) Field of Classification Search
CPC combination set(s) only.
See application file for complete search history.

(56) References Cited

U.S. PATENT DOCUMENTS

| | | | | |
|---|---|---|---|---|
| 6,034,757 A | * | 3/2000 | Yanagawa | ......... G02F 1/134363 349/141 |
| 9,523,893 B2 | | 12/2016 | Tsuruma et al. | |

(Continued)

FOREIGN PATENT DOCUMENTS

| | | |
|---|---|---|
| JP | 9-179096 | 7/1997 |
| JP | 2015-40881 | 3/2015 |

(Continued)

*Primary Examiner* — Lauren Nguyen
(74) *Attorney, Agent, or Firm* — Oblon, McClelland, Maier & Neustadt, L.L.P.

(57) ABSTRACT

A display device includes: a plurality of video lines and a plurality of scanning lines provided over an insulating base material; a light shielding film overlapping with the plurality of video lines and the plurality of scanning lines; a pixel electrode and a common electrode provided in a sub-pixel region surrounded by the plurality of video lines and the plurality of scanning lines in plan view; a liquid crystal layer driven by an electric field generated between the pixel electrode and the common electrode; and a first insulating layer provided between the pixel electrode and the common electrode. The common electrode is provided between the first insulating layer and the liquid crystal layer, and has an opening overlapping with the plurality of video lines and the plurality of scanning lines and overlapping with the pixel electrode. In a light transmission region surrounded by the light shielding film, a shape of the pixel electrode is a linear shape without a branching portion.

17 Claims, 18 Drawing Sheets

(52) U.S. Cl.
CPC ............ *G02F 2001/134372* (2013.01); *G02F 2001/134381* (2013.01); *G02F 2201/121* (2013.01); *G02F 2201/40* (2013.01)

(56) References Cited

U.S. PATENT DOCUMENTS

| | | | |
|---|---|---|---|
| 9,703,152 B2 | 7/2017 | Sakai et al. | |
| 2010/0259713 A1* | 10/2010 | Sato | G02F 1/133345 349/138 |
| 2015/0055043 A1* | 2/2015 | Sakai | G02F 1/134363 349/42 |
| 2015/0301381 A1 | 10/2015 | Okita | |
| 2015/0346564 A1* | 12/2015 | Moriwaki | G02F 1/134309 349/43 |

FOREIGN PATENT DOCUMENTS

| | | |
|---|---|---|
| JP | 2015-118193 | 6/2015 |
| JP | 2015-206829 A | 11/2015 |

\* cited by examiner

DISPLAY DEVICE HAVING A FIRST ELECTRODE WITH AN OPENING OVERLAPPING WITH A SECOND ELECTRODE

CROSS-REFERENCE TO RELATED APPLICATION

The present application claims priority from Japanese Patent Application No. 2017-040032 filed on Mar. 3, 2017, the content of which is hereby incorporated by reference into this application.

TECHNICAL FIELD OF THE INVENTION

The present invention relates to a display device and relates to, for example, an effective technique applied to a liquid crystal display device.

BACKGROUND OF THE INVENTION

For example, a display device such as a liquid crystal display device includes a pixel electrode and a common electrode in a sub-pixel region surrounded by a plurality of video lines and a plurality of scanning lines on an insulating base material, and a liquid crystal layer driven by an electric field generated between the pixel electrode and the common electrode. (For example, Japanese Patent Application Laid-Open Publication No. 2015-40881 (Patent Document 1), Japanese Patent Application Laid-Open Publication No. H09-179096 (Patent Document 2), and Japanese Patent Application Laid-Open Publication No. 2015-118193 (Patent Document 3).)

SUMMARY OF THE INVENTION

The display device described above is used for a head mount display for virtual reality (VR), for example. With this head mounted display, a user sees a display screen from a distance of substantially several centimeters, and therefore, the head mounted display is required to achieve high definition. When high definition is realized according to this requirement, a pixel size becomes smaller according to the higher definition, and there arises a problem in that transmittance decreases due to restrictions on arrangement of the pixel electrode. Therefore, it is required to achieve preferable arrangement and shape of the common electrode for one pixel electrode.

In view of the above, the present invention has been made to solve the problems of the prior art described above, and it is an object of the present invention to provide a display device which achieves high transmittance with high definition.

The typical ones of the inventions disclosed in the present application will be briefly described as follows. A display device according to one aspect of the present invention includes: an insulating base material; a plurality of video lines and a plurality of scanning lines provided over the insulating base material; a light shielding film overlapping with the plurality of video lines and the plurality of scanning lines; a first electrode and a second electrode provided in a sub-pixel region surrounded by the plurality of video lines and the plurality of scanning lines in plan view; a liquid crystal layer driven by an electric field generated between the first electrode and the second electrode; and a first insulating layer provided between the first electrode and the second electrode. The second electrode is provided between the first insulating layer and the liquid crystal layer, and has an opening overlapping with the plurality of video lines and the plurality of scanning lines and overlapping with the first electrode. In a light transmission region surrounded by the light shielding film, a shape of the first electrode is a linear shape without a branching portion.

BRIEF DESCRIPTIONS OF THE DRAWINGS

DESCRIPTIONS OF THE PREFERRED EMBODIMENTS

Figure 1:
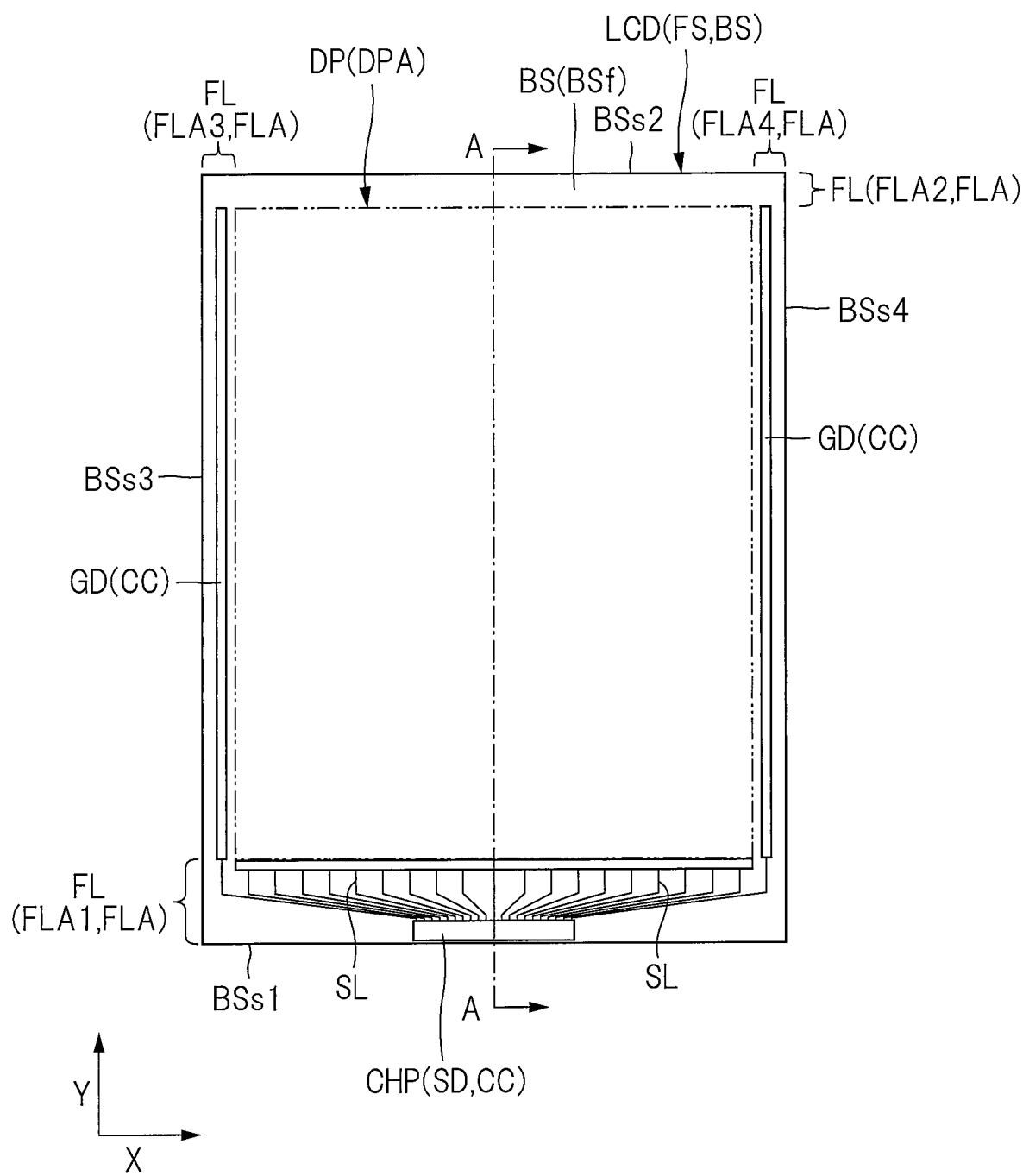
FIG. 1 is a plan view showing an example of a display device according to an embodiment.

In the following, embodiments of the present invention will be described with reference to the drawings.

Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be more schematically illustrated in the drawings than those in an actual state, but they are examples only and do not limit the interpretation of the present invention.

In addition, in this specification and the respective drawings, the same components described in the drawings which have been described before are denoted by the same reference characters, and detailed description thereof may be omitted as needed.

In addition, in some drawings used in the embodiments, hatching may be omitted even in a cross-sectional view so as to make the drawings easy to see. Also, hatching may be used even in a plan view so as to make the drawings easy to see.

Also, in the present specification, such descriptions that "α includes A, B, or C," "α includes any of A, B, and C," and "α includes one selected from a group consisting of A, B, and C" does not exclude a case where α includes a plurality of combinations of A to C, unless particularly explicitly described otherwise. Further, these descriptions do not also exclude a case where α includes other component.

Techniques described in the following embodiments can be widely applied to a display device having a mechanism for supplying signals from a periphery of a display region to a plurality of elements provided in the display region having an electro-optical layer. In the following embodiments, a liquid crystal display device will be described as a typical example of the display device.

Embodiment

<Configuration of Display Device>

Figure 2:
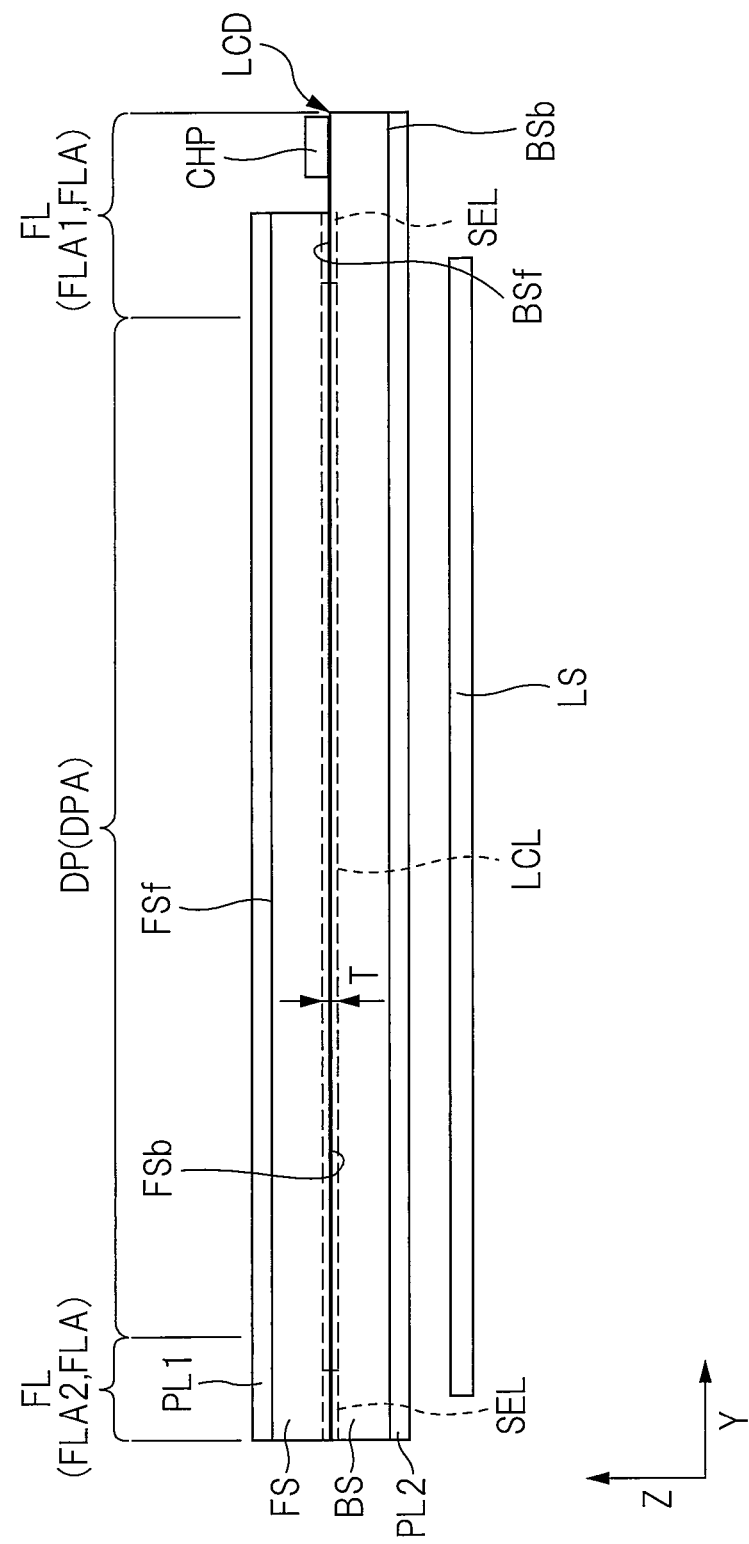
FIG. 2 is a cross-sectional view taken along a line A-A.

First, referring to FIG. 1 and FIG. 2, a configuration of a display device will be described. FIG. 1 is a plan view showing an example of a display device according to the present embodiment. FIG. 2 is a cross-sectional view taken along a line A-A. Note that, for viewability in FIG. 1, illustration of scanning lines GL (see FIG. 3 to be described later) and video lines SL (see FIG. 3 to be described later) are omitted in a display region DPA. Although FIG. 2 is a cross section, hatching is omitted for viewability.

As shown in FIG. 1, a display device LCD according to the present embodiment includes a display section DP which displays an image. The display device LCD includes an array substrate BS and a counter substrate FS. For example, of the array substrate BS, a region where the display section DP is provided is the display region DPA. Also, in plan view, the display device LCD includes a frame section (peripheral section) FL which is a portion around the display section DP and which does not display an image. A region where the frame section FL is provided is a frame region FLA. That is, the frame region FLA is a region (peripheral region) outside the display region DPA.

Note that, in the specification of the present application, as shown in FIG. 1, "in plan view" means a view that is seen from a direction perpendicular to a counter surface BSf (see FIG. 2) serving as a main surface of the array substrate BS. Also, directions crossing each other, preferably two orthogonal directions, on the counter surface BSf serving as the main surface of the array substrate BS are defined as an X-axis direction and a Y-axis direction. A direction perpendicular to the counter surface BSf serving as the main surface of the array substrate BS is defined as a Z-axis direction (see FIG. 2).

Also, the display device LCD has a structure in which a liquid crystal layer, which is an electro-optical layer, is formed between a pair of substrates disposed so as to face each other. That is, as shown in FIG. 2, the display device LCD includes the counter substrate FS on a display surface side, the array substrate BS on an opposite side of the counter substrate FS, and a liquid crystal layer LCL disposed between the counter substrate FS and the array substrate BS.

Also, in plan view, the array substrate BS shown in FIG. 1 includes a side BSs1 extending along the X-axis direction, a side BSs2 extending parallel to the side BSs1 in the X-axis direction, a side BSs3 extending along the Y-axis direction crossing the X-axis direction or more preferably, perpendicular to the X-axis direction, and a side BSs4 extending parallel to the side BSs3 along the Y-axis direction. A distance from each of the sides BSs2, BSs3, and BSs4 of the array substrate BS shown in FIG. 1 to the display section DP is substantially the same and is shorter than a distance from the side BSs1 to the display section DP.

The display section DP has a plurality of pixels Pix (see FIG. 3 described later) as display elements. That is, the plurality of pixels Pix are provided in the display region DPA of the array substrate BS. The plurality of pixels Pix are arrayed in a matrix in the X-axis direction and the Y-axis direction. In the present embodiment, each of the plurality of pixels Pix has a thin film transistor (TFT) formed in the display region DPA on a counter surface BSf side of the array substrate BS.

As will be described with reference to FIG. 3 described later, the display device LCD includes a plurality of scanning lines GL and a plurality of video lines SL. As will be described with reference to FIG. 3 described later, the plurality of scanning lines GL are electrically connected to the plurality of pixels Pix arrayed in the X-axis direction, respectively. The plurality of video lines SL are electrically connected to the plurality of pixels Pix arrayed in the Y-axis direction, respectively.

Also, the display device LCD includes a driving circuit CC. The driving circuit CC includes a scanning line driving circuit GD and a video line driving circuit SD. As will be described with reference to FIG. 3 described later, the scanning line driving circuit GD is electrically connected to the plurality of pixels Pix via the plurality of scanning lines GL. The video line driving circuit SD is electrically connected to the plurality of pixels Pix via the plurality of video lines SL.

In the example shown in FIG. 1, the frame region FLA includes frame regions FLA1, FLA2, FLA3, and FLA 4. In plan view, the frame region FLA1 is a region disposed on one side (a lower side in FIG. 1) in the Y-axis direction with respect to the display region DPA, and is a region in which a semiconductor chip CHP and an external circuit substrate (not shown) are mounted. The frame region FLA2 is a region disposed on an opposite side to the frame region FLA1 (an upper side in FIG. 1) with the display region DPA interposed therebetween. In plan view, the frame region FLA3 is a region disposed on one side (a left side in FIG. 1) in the X-axis direction with respect to the display region DPA, and the frame region FLA4 is a region disposed on an opposite side of the frame region FLA3 with the display region DPA interposed therebetween.

In the example shown in FIG. 1, a semiconductor chip CHP is provided in the array substrate BS. The semiconductor chip CHP is mounted in the frame region FLA1 in plan view. In the semiconductor chip CHP, the video line driving circuit SD is provided. Therefore, the video line driving circuit SD is provided in the region on the counter surface BSf side of the array substrate BS, that is, in the frame region FLA1 which is a region disposed on the one side with respect to the display region DPA in the Y-axis direction.

Note that the frame region FLA1 in which the semiconductor chip CHP is mounted may be referred to as a lower frame region. The frame region FLA2 disposed on the opposite side of the frame region FLA1 across the display region DPA may be referred to as an upper frame region. At this time, the frame regions FLA3 and FLA4 disposed on both sides in the direction (X-axis direction) crossing the direction (Y-axis direction) where the frame region FLA1 is disposed with respect to the display region DPA may be referred to as a left frame region and a right frame region, respectively.

Also, the semiconductor chip CHP may be provided in the frame region FLA1 using the so-called the chip-on-glass (COG) technique. Alternatively, the semiconductor chip CHP may be provided outside the array substrate BS and connected to the array substrate BS via a flexible printed circuit (FPC). The frame region FLA1 is provided with a terminal portion connecting the array substrate BS and the outside.

Also, as shown in FIG. 2, the display device LCD has a seal SEL disposed in the frame region FLA. The seal SEL is formed so as to continuously surround the periphery of the display section DP. The counter substrate FS and the array substrate BS shown in FIG. 2 are adhered and fixed to each other by a seal material provided on the seal SEL. In this manner, by providing the seal SEL around the display section DP, it is possible to seal the liquid crystal layer LCL which is the electro-optical layer.

Also, as shown in FIG. 2, a backlight LS composed of optical elements such as a light source and a diffusion plate, and a polarization plate PL2 polarizing light generated from the backlight LS are provided on a side of a back surface BSb of the array substrate BS of the display device LCD. The polarization plate PL2 is fixed to the array substrate BS. Meanwhile, on a side of a back surface FSf of the counter substrate FS, a polarization plate PL1 is provided. The polarization plate PL1 is fixed to the counter substrate FS.

Note that, although basic components of the display device LCD are exemplarily shown in FIG. 2, as a modification example, in addition to the components shown in FIG. 2, other parts such as a touch panel and a protective layer can be added.

Further, as described with reference to FIG. 5 and FIG. 6 described later, the display device LCD includes the plurality of pixel electrodes PE and the common electrode CE. The display device LCD according to the present embodiment is a display device employing the horizontal electric field mode as a mode in which the electric field is applied to the liquid crystal layer LCL. Therefore, the plurality of pixel electrode PE and the common electrode CE are formed in the array substrate BS.

The array substrate BS is composed of a glass substrate and the like, and a circuit for image display is mainly formed therein. The array substrate BS has the counter surface BSf (see FIG. 2) positioned on the counter substrate FS side, and the back surface BSb (see FIG. 2) positioned on the opposite side thereof. On the counter surface BSf side of the array substrate BS, a driving element such as a TFT and the plurality of pixel electrodes PE are formed in a matrix. Also, the array substrate BS includes the display region DPA and the frame region FLA provided outside the display region DPA. The array substrate BS may be formed not only by a glass substrate but also by a resin such as polyimide.

Meanwhile, the counter substrate FS is composed of a glass substrate or the like, and a color filter (not shown) forming an image of color display is formed thereon. The counter substrate FS has the back surface FSf (see FIG. 2) which is the display surface side and a counter surface FSb (see FIG. 2) positioned on the opposite side of the back surface FSf. The counter substrate FS is disposed to face the array substrate BS with the counter surface BSf of the array substrate BS and the counter surface FSb of the counter substrate FS facing each other. Note that the array substrate BS can also be referred to as a TFT substrate and the counter substrate FS on which the color filter is formed can also be referred to as a color filter substrate.

The color filter of the counter substrate FS is made by periodically arraying color filter pixels in three colors, i.e., red, green, and blue. A light shielding film is formed at a boundary of each color filter pixel.

In the display device LCD according to the present embodiment, light emitted from the backlight LS (see FIG. 2) is filtered by the polarization plate PL2 (see FIG. 2) and enters the liquid crystal layer LCL. The light entering the liquid crystal layer LCL changes its polarization state by liquid crystals and is emitted from the counter substrate FS. At this time, orientation of the liquid crystals is controlled by an electric field formed by applying a voltage to the pixel electrode PE and the common electrode CE, and the liquid crystal layer LCL functions as an optical shutter.

<Equivalent Circuit of Display Device>

Next, referring to FIG. 3, an equivalent circuit of the display device LCD will be described. FIG. 3 is diagram showing an example of the equivalent circuit of the display device LCD according to the present embodiment.

Figure 3:
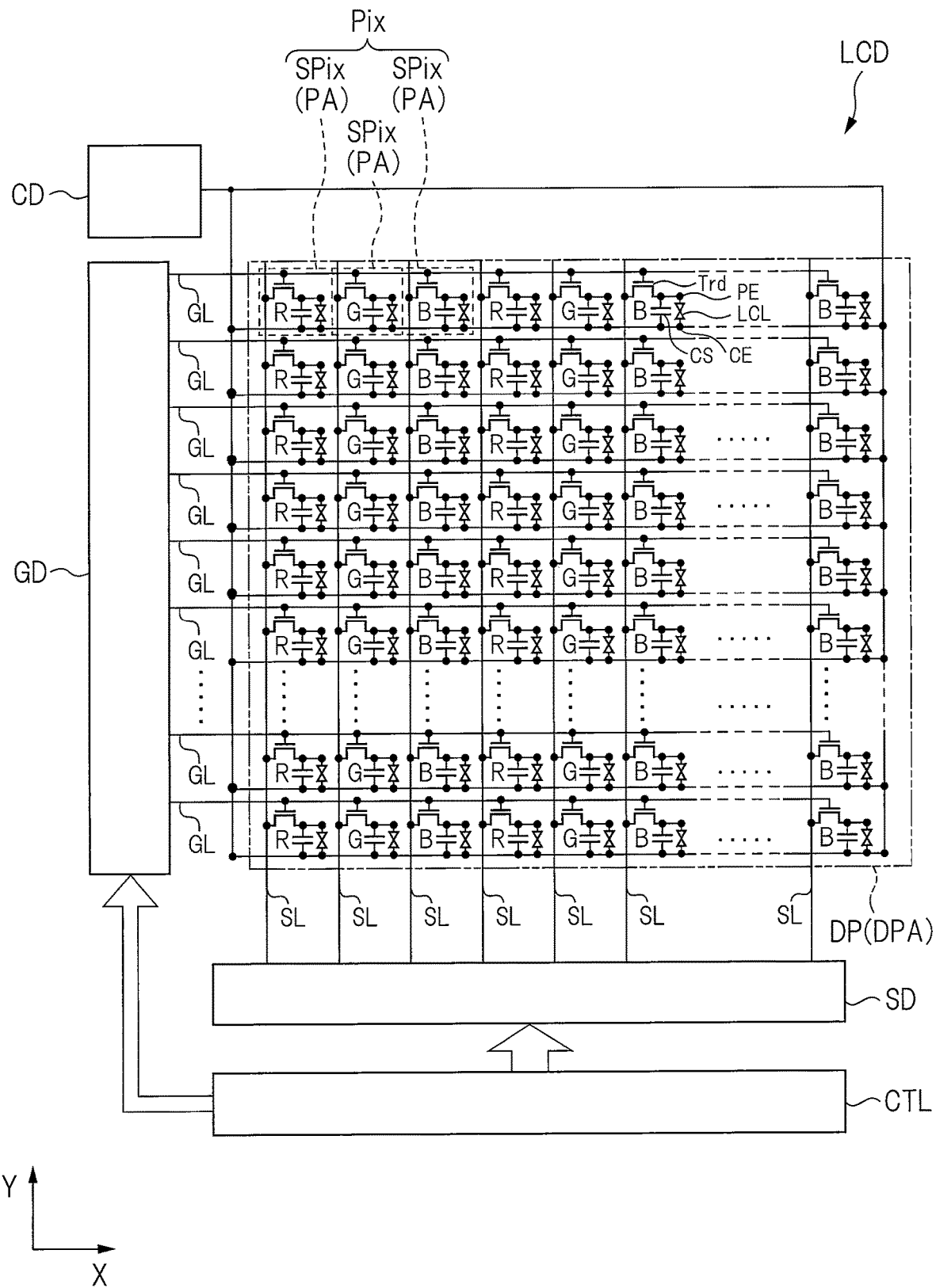
FIG. 3 is diagram showing an example of an equivalent circuit of the display device according to the embodiment.

As shown in FIG. 3, the display section DP of the display device LCD includes the plurality of pixels Pix. The plurality of pixels Pix are provided in the array substrate BS in the display region DPA in plan view and are arrayed in a matrix in the X-axis direction and the Y-axis direction.

Also, the display device LCD includes the plurality of scanning lines GL and the plurality of video lines SL. The plurality of scanning lines GL are provided in the display region DPA in the array substrate BS (see FIG. 2, for example). The plurality of scanning lines GL extend in the X-axis direction and are arrayed in the Y-axis direction. The plurality of video lines SL are provided in the display region DPA in the array substrate BS. The plurality of video lines SL extend in the Y-axis direction and are arrayed in the X-axis direction. The plurality of video lines SL and the plurality of scanning lines GL cross each other.

Each of the plurality of pixels Pix includes a sub-pixel SPix which displays each color of R (red), G (green), and B (blue). Each of the sub-pixels SPix is provided in a sub-pixel region PA surrounded by two adjacent scanning lines GL and two adjacent video lines SL. Alternatively, the sub-pixel SPix may have another configuration.

Each sub-pixel SPix includes a thin film transistor Trd, a pixel electrode PE connected to a drain electrode of the transistor Trd, a common electrode CE facing the pixel electrode PE with the liquid crystal layer LCL interposed therebetween. In FIG. 3, a holding capacitance CS formed between the common electrode CE and the pixel electrode PE is shown. Note that the drain electrode and a source electrode of the thin film transistor are appropriately interchanged depending on a polarity of a potential.

The driving circuit CC (see FIG. 1) of the display device LCD includes a video line driving circuit SD, a scanning line driving circuit GD, a control circuit CTL, and a common electrode driving circuit CD. The video line driving circuit SD, the control circuit CTL, and the common electrode driving circuit CD are provided in the semiconductor chip CHP mounted in the frame region FLAT. The scanning line driving circuit GD is provided in the frame region FLA3 and the frame region FLA4.

The source electrode of the transistor Trd of each of the plurality of sub-pixels SPix arrayed in the Y-axis direction is connected to the video line SL. Also, each of the plurality of video lines SL is connected to the video line driving circuit SD. The video line driving circuit SD supplies a video signal to each of the video lines SL.

Also, a gate electrode of the transistor Trd of each of the plurality of sub-pixel SPix arrayed in the X-axis direction is connected to the scanning line GL. Also, each scanning line GL is connected to the scanning line driving circuit GD. The scanning line driving circuit GD supplies a scanning signal to each of the scanning lines GL.

The control circuit CTL controls a video line driving circuit SD, a scanning line driving circuit GD, and a common electrode driving circuit CD on the basis of display data and display control signals such as a clock signal and a display timing signal transmitted from the outside of the display device LCD.

Based on an array of the sub-pixels, a display method, presence or absence of an RGB switch (illustration is omitted), presence or absence of a touch panel (illustration is omitted), and the like of the display device LCD, the control circuit CTL appropriately converts the display data and the display control signals provided from the outside to output the converted display data and display control signals to the video line driving circuit SD, the scanning line driving circuit GD, and the common electrode driving circuit CD.

<Head Mount Display>

Figure 4:
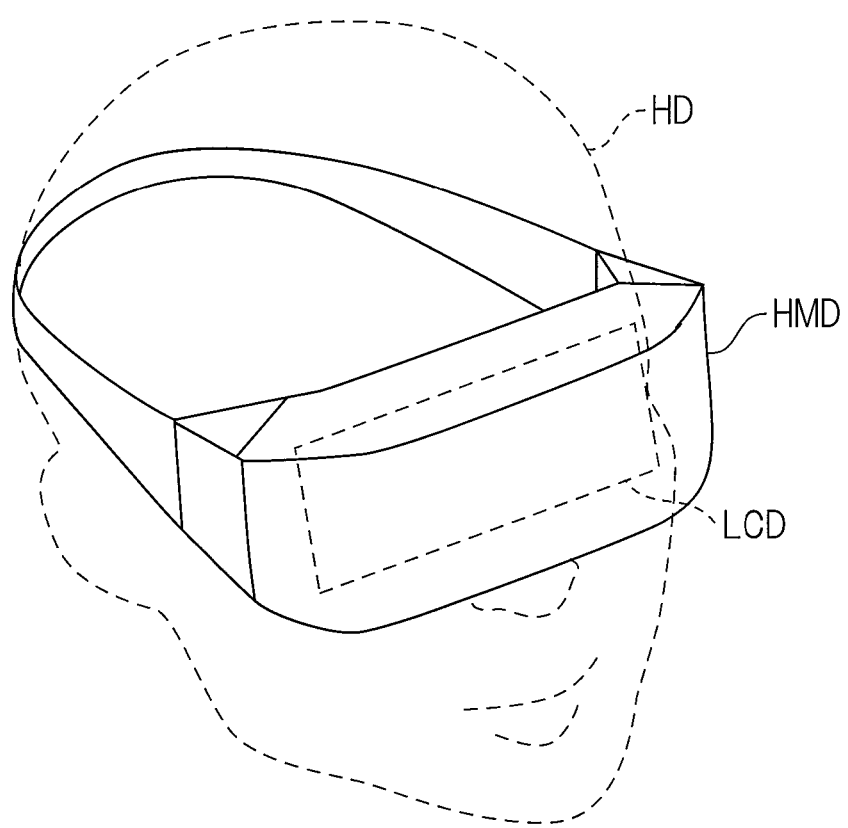
FIG. 4 is an explanatory view showing an example of a head mount display to which the display device according to the embodiment is applied.

The display device LCD described above is used for a head mount display HMD for virtual reality (VR) shown in FIG. 4, for example. FIG. 4 is an explanatory diagram showing an example of the head mount display HMD to which the display device LCD according to the present embodiment is applied.

In the head mount display HMD, a main body having the above-described display device LCD incorporated therein is attached a person's head HD. Accordingly, the person who wears the main body can see an image displayed on the display screen of the display device LCD. In this head mount display HMD, since the display screen is viewed from a distance of substantially several centimeters, this head mount display HMD is required to achieve high definition. When high definition is achieved according to this requirement, a pixel size decreases according to the high definition, and there arises a problem in that transmittance decreases due to restrictions on arrangement of the pixel electrodes.

In view of the above, the present embodiment has been made to solve the problems of the prior art described above, and it is an object of the present embodiment to provide a display device which realizes high transmittance with high definition.

For example, in the display device LCD, the pixel size decreases as the definition becomes higher. When the pixel size decreases, the transmittance decreases due to restrictions on arrangement of the pixel electrodes. Also, as the pixel size decreases, the number of branches of the pixel electrode PE (comb-shaped electrode) disposed physically in a single pixel decreases due to restriction on a line width of the pixel electrode PE. The number of branches ultimately becomes zero, and one (linear-shaped) electrode is obtained as an electrode. That is, in the sub-pixel structure realizing high definition, an area per pixel is small, and therefore, one pixel electrode PE is disposed in an opening of the common electrode CE.

Also, in the display device LCD, the method of applying the electric field to the liquid crystal layer LCL includes the vertical electric field mode and the horizontal electric field mode. In the horizontal electric field mode, a pair of pixel electrode PE and common electrode CE is provided so as to be insulated from each other on an inner surface side of the array substrate BS, which is one of the array substrate BS and the counter substrate FS disposed with the liquid crystal layer LCL sandwiched therebetween, and a horizontal electric field is applied to liquid crystal molecules. In this horizontal electric field mode, there are an in-plane switching (IPS) mode in which a pair of pixel electrode PE and common electrode CE does not overlap with each other in plan view, and a fringe-field switching (FFS) mode in which a pair of pixel electrode PE and common electrode CE overlaps with each other in plan view.

Generally, in the IPS mode, the electric field for the liquid crystals is weak on the pixel electrode PE and the common electrode CE. Therefore, on the pixel electrode PE, the liquid crystals do not rotate sufficiently, and accordingly, the transmittance tends to be low. In contrast, generally, in the FFS mode, the pixel electrode PE and the common electrode CE produce a powerful fringe electric field, and therefore, a relatively high transmittance is achieved not only on the pixel electrode PE but also between the pixel electrodes PE. For example, in a display device having a sub-pixel resolution of 500 ppi or less, the transmittance equivalent to that in the FFS mode can be obtained in the IPS mode, but in the IPS mode, it is necessary to apply a much higher voltage than that in the FFS mode. However, if the sub-pixels are made into high definition, and the number of pixel electrodes PE becomes one, the number of electrodes is extremely reduced. In this case, depending on a specific condition, the transmittance in the IPS mode may be equivalent to the transmittance in the FFS mode, or the IPS mode may have higher transmittance than the FFS mode. The reason for this is that, in the case of the FFS mode, an electric field width per electrode is narrow, and therefore, when the number of electrodes decreases, it becomes difficult to evenly apply the electric field to the entire sub-pixel region PA. As a result, in the entire sub-pixel, the IPS mode may have higher transmittance.

Also, whether the liquid crystal used for the liquid crystal layer LCL is a positive type or a negative type has influence on realization of high-speed response of the display device LCD. A positive type liquid crystal having lower viscosity than that of a negative type liquid crystal is advantageous for realizing the high-speed response. Note that the positive type liquid crystal has a positive dielectric anisotropy in which a dielectric constant in applying a voltage in a major axis direction of the liquid crystal molecule is larger than a dielectric constant in applying a voltage in a minor axis direction. In contrast, the negative type liquid crystal has a negative dielectric anisotropy in which a dielectric constant in applying a voltage in the major axis direction of the liquid crystal molecule is smaller than a dielectric constant in applying a voltage in the minor axis direction.

<Structure of Sub-Pixel>

In the following, in the display device LCD according to the present embodiment, a sub-pixel structure will be described with reference to FIG. 5 and FIG. 6. FIG. 5 is a plan view showing an example of a sub-pixel structure of the display device LCD according to the present embodiment. FIG. 6 is a cross-sectional view taken along a line B-B. FIG. 5 and FIG. 6 show a sub-pixel structure of a single pixel, of the plurality of sub-pixels SPix arrayed in a matrix in the X-axis direction and the Y-axis direction. Each of the sub-pixels SPix is provided in the sub-pixel region PA surrounded by two adjacent scanning lines GL and two adjacent video lines SL. Also, each of the sub-pixels Spix has a light transmission region TA surrounded by a light shielding film BM. In FIG. 5, the light transmission region TA is a region inside a rectangle indicated by a two-dot chain line. The light shielding film BM is a film disposed in a region outside the rectangle indicated by the two-dot chain line. The light shielding film BM overlaps with the plurality of video lines SL and the plurality of scanning lines GL.

Figure 5:
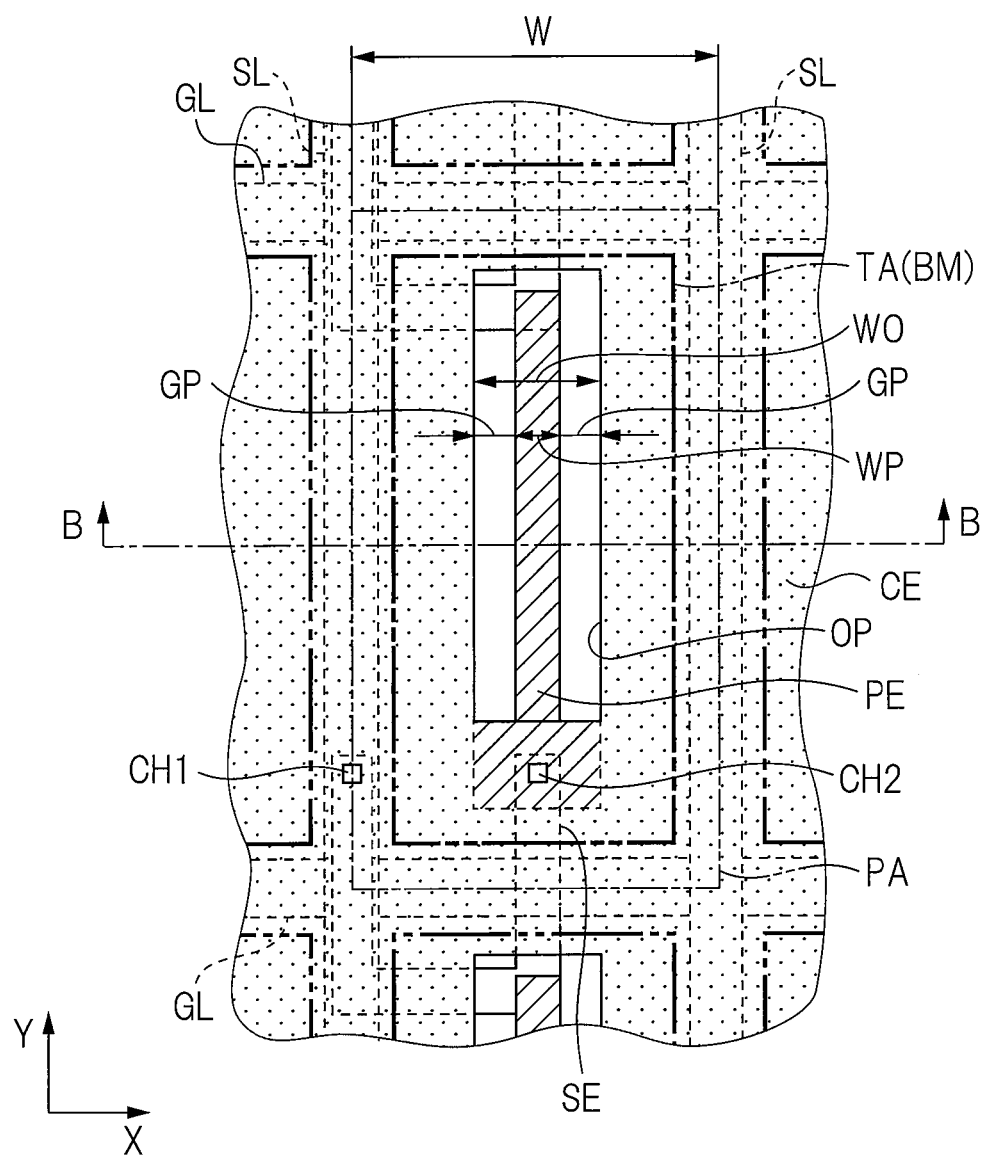
FIG. 5 is a plan view showing an example of a sub-pixel structure of the display device according to the embodiment.
Figure 6:
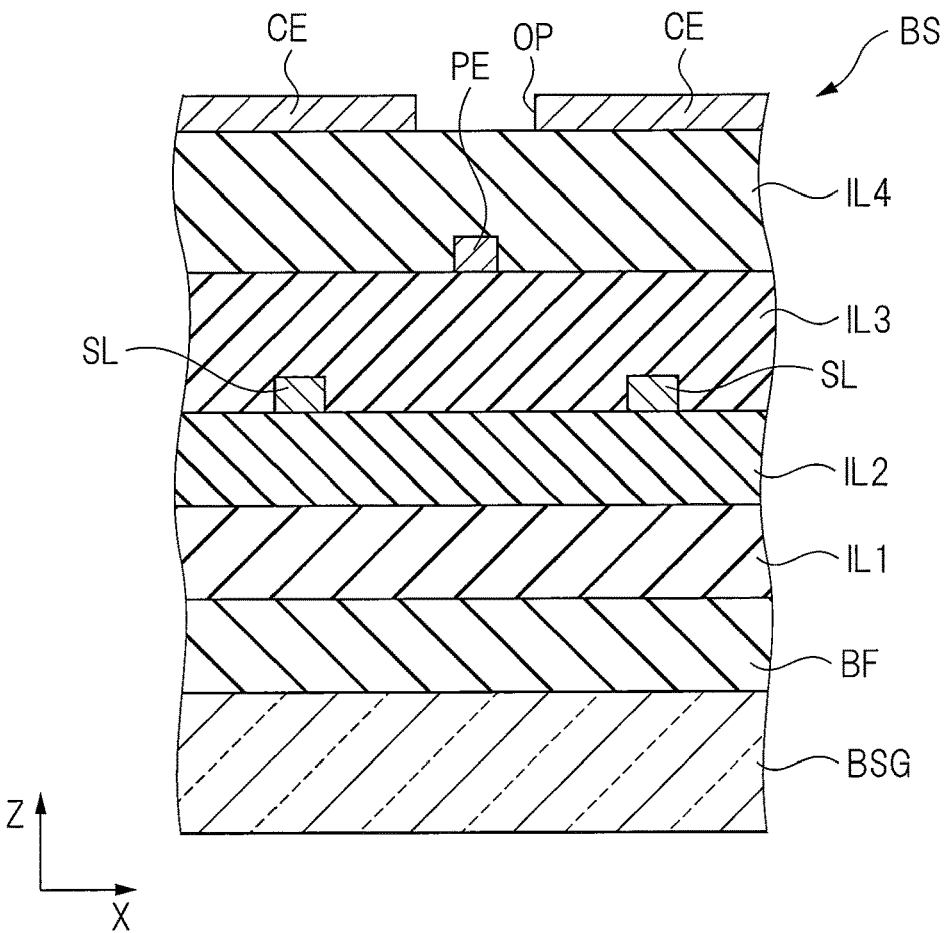
FIG. 6 is a cross-sectional view taken along a line B-B.

As shown in FIG. 5 and FIG. 6, the array substrate BS includes an insulating base material BSG, the plurality of video lines SL and the plurality of scanning lines GL over the insulating base material BSG, and the sub-pixel region PA surrounded by the plurality of video lines SL and the plurality of scanning lines GL in plan view. Also, the array substrate BS has a first electrode and a second electrode in the sub-pixel region PA. In the present embodiment, the first electrode is the pixel electrode PE, and the second electrode is the common electrode CE. An insulating layer IL4 (first insulating layer) is provided between the pixel electrode PE and the common electrode CE. On the counter substrate FS side of the array substrate BS, there is provided a liquid crystal layer LCL driven by an electric field generated between the pixel electrode PE and the common electrode CE.

As shown in FIG. 6, for example, the array substrate BS includes a base film BF and insulating layers IL1 to IL4 over the insulating base material BSG. In the array substrate BS, the base film BF is provided on the insulating substrate BSG. On the base film BF, a semiconductor layer SE (see FIG. 5) is provided. The semiconductor layer SE is covered with the insulating layer IL1. On the insulating layer IL1, the scanning line GL (see FIG. 5) is provided. The scanning line GL is covered with the insulating layer IL2. On the insulating layer IL2, the video line SL is provided. The video line SL is covered with the insulating layer IL3. On the insulating layer IL3, the pixel electrode PE is provided. The pixel electrode PE is covered with the insulating layer IL4. On the insulating layer IL4, the common electrode CE is provided.

As shown in FIG. 5, in the array substrate BS, the plurality of scanning lines GL extend in the X-axis direction and are arrayed in the Y-axis direction. The plurality of video lines SL extend in the Y-axis direction and are arrayed in the X-axis direction. The region surrounded by two adjacent scanning lines GL and two adjacent video lines SL is a sub-pixel region PA. The video line SL is connected to the semiconductor layer SE through a contact hole CH1. The pixel electrode PE has a linear shape extending in the Y-axis direction. The pixel electrode PE is connected to the semiconductor layer SE through a contact hole CH2. The common electrode CE is opened such that a gap GP is provided between the common electrode CE and the pixel electrode PE, and the common electrode CE has a linear opening OP extending in the Y-axis direction. The opening OP is also referred to as a slit because the opening OP is linear.

Since the display device LCD of the present embodiment is applied to the display device in the horizontal electric field mode, the pixel electrode PE and the common electrode CE are formed in the array substrate BS. In this array substrate BS, the common electrode CE is disposed closer to the liquid crystal layer LCL than the pixel electrode PE. The pixel electrode PE and the common electrode CE are made of a transparent conductive material such as indium tin oxide (ITO), for example.

As shown in FIG. 5, a shape of the pixel electrode PE is a linear shape having no branch portion in the light transmission region TA surrounded by the light shielding film BM. Also, the common electrode CE has an opening OP overlapping with the pixel electrode PE. That is, one line of the pixel electrode PE is disposed in the opening OP of the common electrode CE, and more specifically, the pixel electrode PE has a structure of so-called one line of the electrode shape.

Furthermore, the pixel electrode PE and the common electrode CE have a gap GP provided between an end portion of the pixel electrode PE and an end portion of the common electrode CE in plan view. Further, in plan view and in the sub-pixel region PA, the common electrode CE is formed closer to the outside than the pixel electrode PE. In other words, a width WO of the opening OP of the common electrode CE is larger than a width WP of the pixel electrode PE, and the pixel electrode PE is disposed in the opening OP of the common electrode CE. That is, the pixel electrode PE and the common electrode CE have a structure that implements the IPS mode of the horizontal electric field mode as the method of applying the electric field to the liquid crystal layer LCL. In addition, in the light transmission region TA, the pixel electrode PE and the common electrode CE do not overlap with each other.

Further, in the present embodiment, a width W of the sub-pixel region PA is, for example, 13 µm (the definition is about 650 ppi) or less, more preferably 12 µm (about 700 ppi) or less, more preferably 10.5 µm (about 800 ppi) or less, and still more preferably 9.5 µm (about 900 ppi) or less. In this case, the gap GP provided between the end portion of the pixel electrode PE and the end portion of the common electrode CE is smaller than the width WP of the pixel electrode PE. For example, as an example of simulation results indicated in FIG. 7 to FIG. 9 to be described later, the gap GP provided between the end portion of the pixel electrode PE and the end portion of the common electrode CE is 0.5 µm, and the width WP of the pixel electrode PE is 2 µm. In this example, the width WO of the opening OP is 3 µm.

As shown in FIG. 6, the array substrate BS includes the insulating layer IL4 between the pixel electrode PE and the common electrode CE. The common electrode CE is provided between the insulating layer IL4 and the liquid crystal layer LCL. That is, the sub-pixel structure of the array substrate BS has such a structure that the upper layer (a liquid crystal layer LCL side) is the common electrode CE, the lower layer (an opposite side of the liquid crystal layer LCL) is the pixel electrode PE, and the common electrode CE is positioned closer to the liquid crystal layer LCL than the pixel electrode PE.

In Japanese Patent Application Laid-Open Publication No. H09-179096 (Patent Document 2) indicated as prior art, a conductive film shielding the common electrode and the electric field is formed as a separate layer. However, in the case of extremely higher definition pixels, it is difficult to form two common electrode wirings in the pixel region. Also, when two common electrode wirings in the pixel region are formed, the metal common electrode wiring results in large reduction in aperture ratio. Furthermore, in the case of such a high-definition pixel, it is necessary to appropriately shield the electric field of the gate line and the electric field between the adjacent pixels with the gate line interposed therebetween. Therefore, in the present invention, as shown in FIG. 5, the common electrode CE having the opening OP disposed on the plane is suitable. With this shape, wetting spread of an orientation film applied on the common electrode CE is also favorable. In addition, by causing the common electrode to function as a shielding conductive film, it is possible to newly form an auxiliary electrode AE shown in FIG. 12 to be described later.

In the present embodiment, the first electrode is the pixel electrode PE, the second electrode is the common electrode CE formed over a plurality of sub-pixel regions PA, and the pixel electrode PE and the common electrode CE do not overlap with each other in the sub-pixel region PA. In other words, the pixel electrode PE and the common electrode CE have a structure to realize the IPS mode, not the FFS mode, in the horizontal electric field mode.

Figure 7:
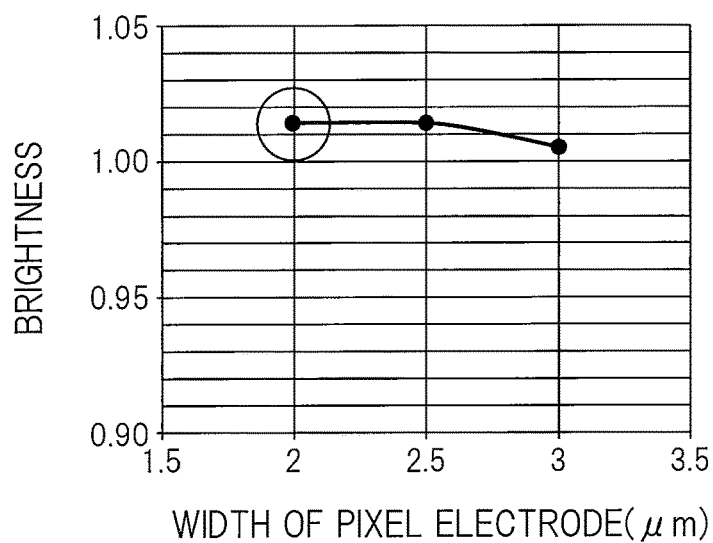
FIG. 7 is a graph indicating an example of a relation between a width of a pixel electrode and brightness in the display device according to the embodiment.
Figure 8:
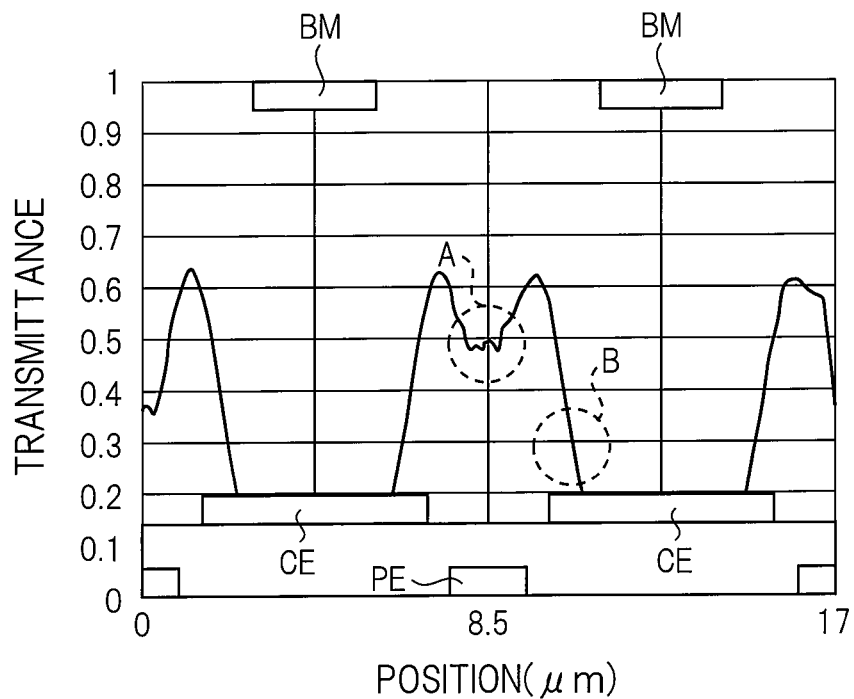
FIG. 8 is a graph indicating an example of a relation between each position of the pixel electrode and a common electrode, and transmittance in the display device according to the embodiment.
Figure 9:
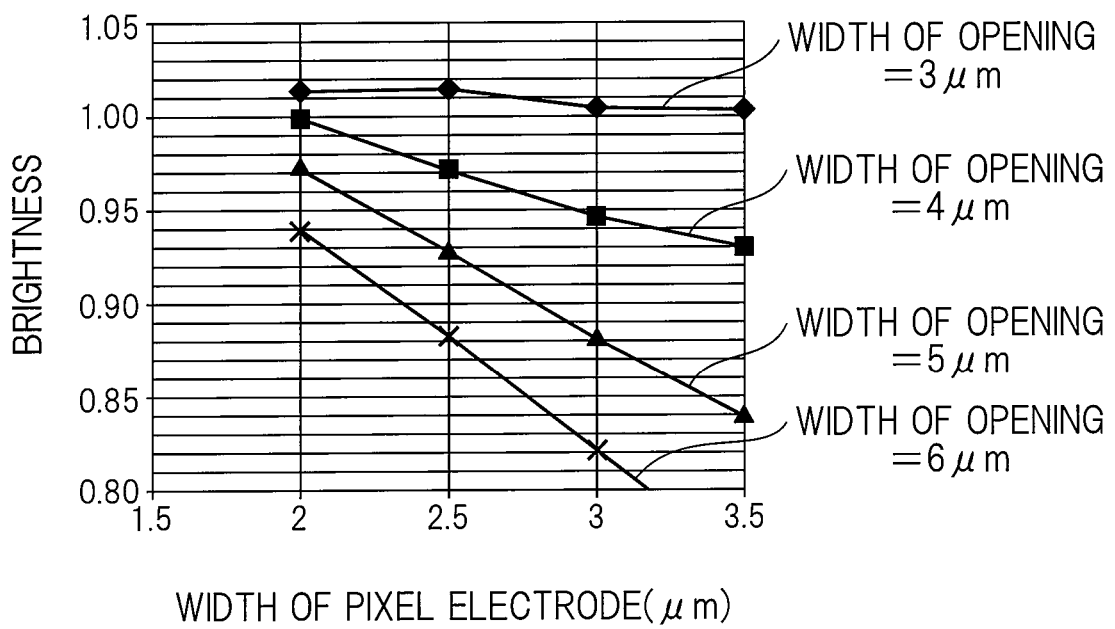
FIG. 9 is a graph indicating an example of a relation between a width of the pixel electrode, a width of an opening of the common electrode, and brightness in the display device according to the embodiment.

Here, the simulation results of the sub-pixel structure performed by the inventor of the present application and the like will be described with reference to FIG. 7 to FIG. 9 and FIG. 14 to FIG. 18. FIG. 7 to FIG. 9 show the present embodiment, and FIG. 14 to FIG. 18 show a comparative example with respect to the present embodiment.

Figure 14:
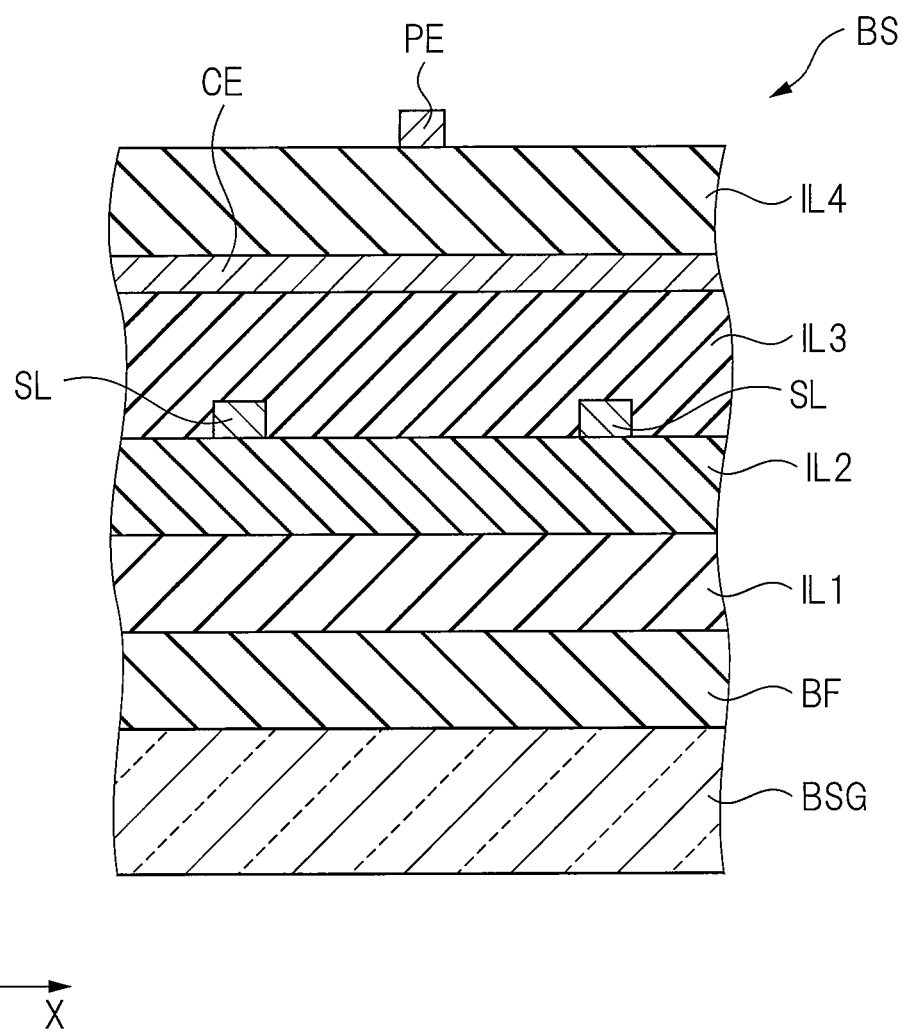
FIG. 14 is a cross-sectional view showing a sub-pixel structure in a display device according to a comparative example with respect to the embodiment.
Figure 15:
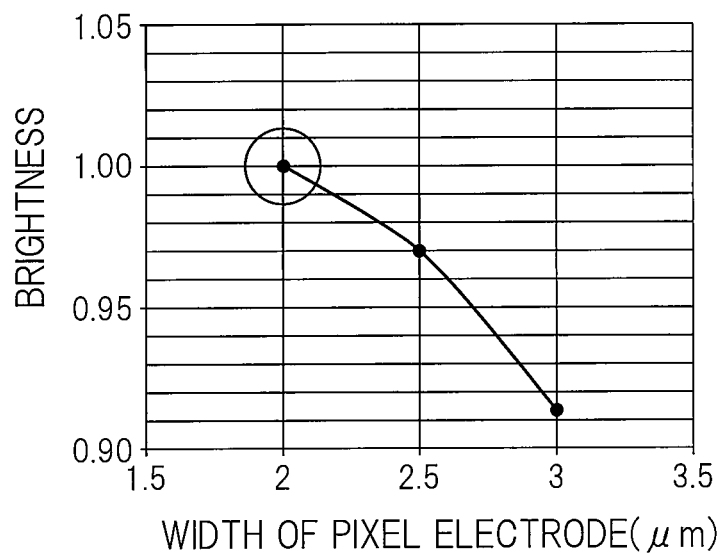
FIG. 15 is a graph showing an example of a relation between a width of a pixel electrode and brightness in the display device according to the comparative example with respect to the embodiment.
Figure 16:
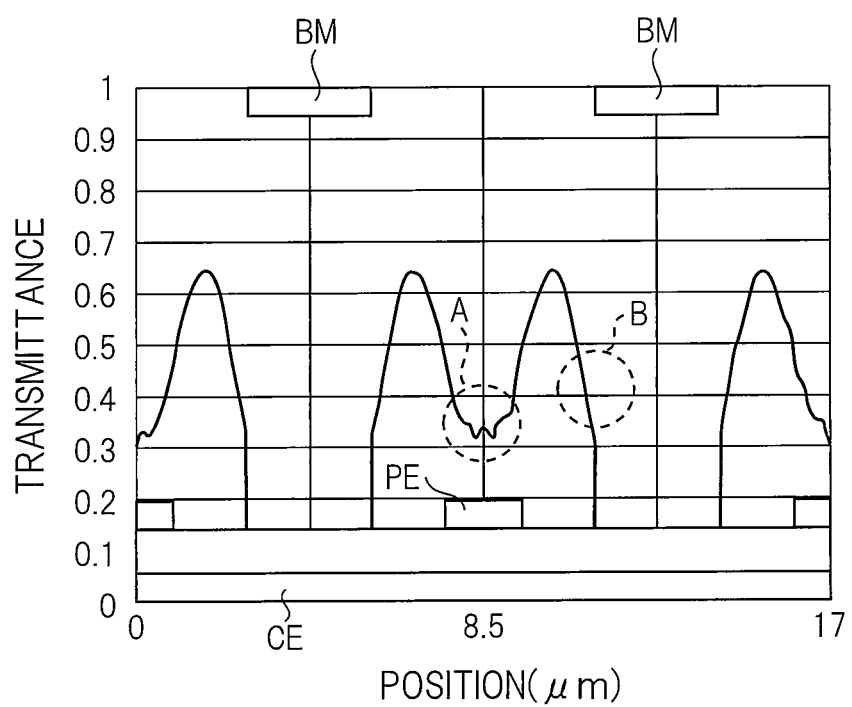
FIG. 16 is a graph showing an example of a relation between each position of the pixel electrode and a common electrode, and transmittance in the display device according to the comparative example with respect to the embodiment.
Figure 17:
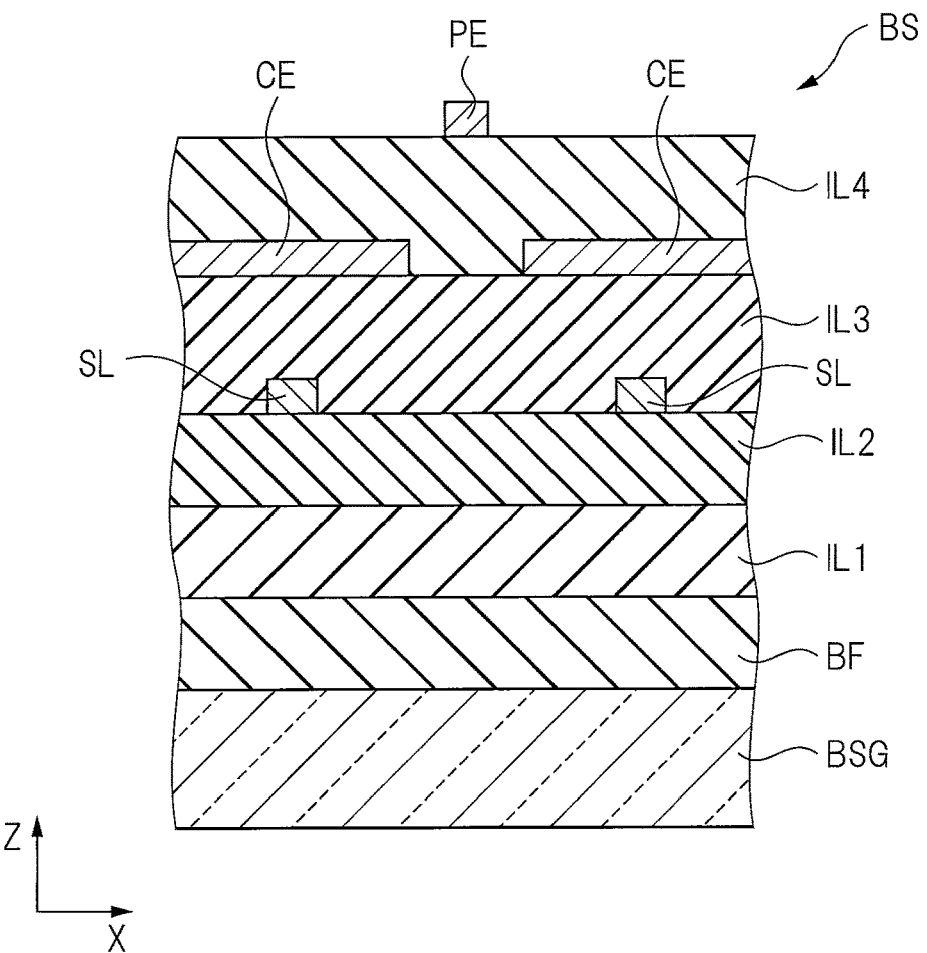
FIG. 17 is a cross-sectional view showing an example of the sub-pixel structure in the display device according to the comparative example with respect to the embodiment.
Figure 18:
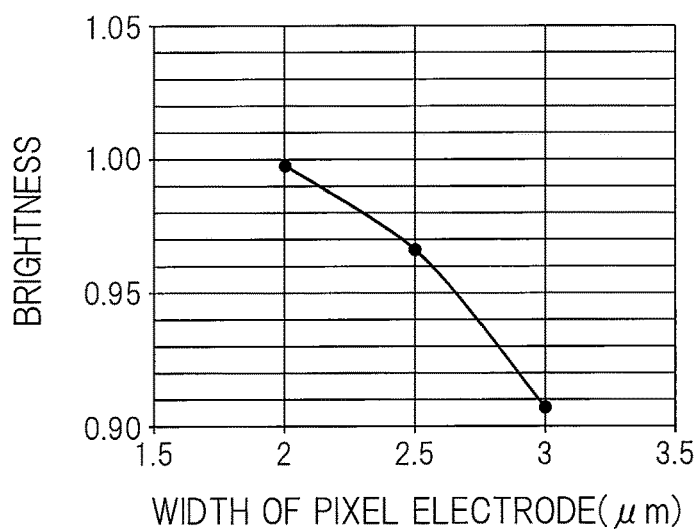
FIG. 18 is a graph showing an example of a relation between a width of the pixel electrode and brightness in the display device according to the comparative example with respect to the embodiment.

First, referring to FIG. 14 to FIG. 18, the comparative example with respect to the present embodiment will be described. FIG. 14 is a cross-sectional view showing a sub-pixel structure in a display device according to the comparative example with respect to the embodiment. FIG. 15 is a graph showing an example of a relation between a width of a pixel electrode and brightness in the display device according to the comparative example with respect to the embodiment. FIG. 16 is a graph showing an example of a relation between each position of the pixel electrode and the common electrode, and transmittance in the display device according to the comparative example with respect to the embodiment. FIG. 14 corresponds to FIG. 6 of the present embodiment, FIG. 15 corresponds to FIG. 7 of the present embodiment, and FIG. 16 corresponds to FIG. 8 of the present embodiment. FIG. 17 and FIG. 18 relate to the display device according to the comparative example with respect to the embodiment.

As shown in FIG. 14, the sub-pixel structure of the array substrate BS according to the comparative example is configured such that the upper layer (the liquid crystal layer LCL side) is the pixel electrode PE, the lower layer (the opposite side of the liquid crystal layer LCL) is the common electrode CE, and the pixel electrode PE is positioned closer to the liquid crystal layer LCL than the common electrode CE. Further, the pixel electrode PE and the common electrode CE overlap with each other. More specifically, the pixel electrode PE and the common electrode CE have a structure to realize the FFS mode in the horizontal electric field mode.

In the sub-pixel structure shown in FIG. 14, as indicated in FIG. 15, when the width of the pixel electrode PE was 2 μm, the brightness was 1.000 (comparison reference value).

When the width of this pixel electrode PE was 2 μm, as indicated in FIG. 16, the transmittance of a center (A portion) of the opening OP of the pixel was low, and the transmittance of a portion (B portion) near the light shielding film BM was high. In the example of FIG. 16, the transmittance of the center (A portion) of the opening OP of the pixel was substantially 0.34, and the transmittance of the portion (B portion) near the light shielding film BM was substantially 0.42. As a result, it became clear that color mixing in which a color of an adjacent pixel is seen in a mixed manner is likely to occur when viewed from an oblique field of view.

Also, as shown in FIG. 17 (Japanese Patent Application Laid-Open Publication No. 2015-118193 (Patent Document 3) indicated as prior art), arrangement in which the pixel electrode PE and the common electrode CE do not with overlap with each other in a structure in which the pixel electrode PE is the upper layer (the liquid crystal layer LCL side) and the common electrode CE (the width of the opening OP is 3 μm) is positioned in the lower layer has been studied. As a result, the graph of FIG. 18 was obtained, and the transmittance indicated in FIG. 7 was better. FIG. 17 is a cross-sectional view showing an example of the sub-pixel structure in the display device according to the comparative example with respect to the embodiment. FIG. 18 is a graph showing an example of a relation between a width of the pixel electrode and brightness in the display device according to the comparative example with respect to the embodiment.

In this regard, as described above (FIG. 5 and FIG. 6), the present embodiment employs a structure that realizes the IPS mode in which the pixel electrode PE and the common electrode CE do not overlap with each other in the structure in which the common electrode CE is positioned closer to the upper layer (the liquid crystal layer LCL side) than the pixel electrode PE.

In the sub-pixel structure of the present embodiment, the simulation results as indicated in FIG. 7 to FIG. 9 have been obtained. FIG. 7 is a graph indicating an example of a relation between a width of the pixel electrode PE and brightness in the display device according to the embodiment. In FIG. 7, an axis of abscissas indicates a width of the pixel electrode PE, and an axis of ordinate indicates brightness. FIG. 8 is a graph indicating an example of a relation between each position of the pixel electrode PE and the common electrode CE, and transmittance in the display device according to the embodiment. In FIG. 8, an axis of abscissas indicates each position of the pixel electrode PE, the common electrode CE, and the light shielding film BM, and an axis of ordinate indicates transmittance. FIG. 9 is a graph indicating an example of a relation between a width of the pixel electrode PE, a width of the opening OP of the common electrode CE, and brightness in the display device according to the embodiment. In FIG. 9, an axis of abscissas indicates a width of the pixel electrode PE, and an axis of ordinate indicates brightness, indicating change in brightness depending on the width of the pixel electrode PE and the width of the opening OP of the common electrode CE.

In the sub-pixel structure of the present embodiment, as indicated in FIG. 7, when the width of the pixel electrode PE was 2 μm, the brightness was 1.015, which indicates that the brightness has been improved as compared with the sub-pixel structure of the comparative example shown in FIG. 14. When the width of this pixel electrode PE was 2 μm, as indicated in FIG. 8, the transmittance of the center (A portion) of the opening OP of the pixel was high, and the transmittance of the portion (B portion) near the light shielding film BM was low. In the example of FIG. 8, the transmittance of the center (A portion) of the opening OP of the pixel was substantially 0.48, and the transmittance of the portion (B portion) near the light shielding film BM was substantially 0.27. As a result, it became clear that, as compared with the sub-pixel structure according to the comparative example shown in FIG. 14, color mixing in which a color of an adjacent pixel is seen in a mixed manner is less likely to occur when viewed from an oblique field of view.

Further, in the sub-pixel structure of the present embodiment, as indicated in FIG. 9, when the width of the pixel electrode PE was 2 μm and the width of the opening OP of the common electrode CE was 3 μm, the brightness was 1.015. As a result, when the width of the pixel electrode PE was 2 μm and the width of the opening OP of the common electrode CE was 3 μm in the example where the definition was 1000 ppi and the width of the sub-pixel region PA was 8.5 μm, the brightness was 1.015. In this case, the gap provided between the end portion of the pixel electrode PE and the end portion of the common electrode CE was 0.5 μm. Note that, in FIG. 9, a thickness of the liquid crystal layer was 2 μm.

Preferred parameters of the high-definition sub-pixel structure will be hereinafter described. The thickness of the liquid crystal layer is preferably 1.5 μm or more and 2.8 μm or less because of high-speed responsivity of the liquid crystal. Furthermore, for the transmittance of the sub-pixel region, the following parameters are preferred. The width of the pixel electrode PE is preferably 1.5 μm or more and 4.5 μm or less. Further, the width of the pixel electrode PE is preferably ⅙ or more and ⅓ or less of the width of the sub-pixel region PA. The width of the opening OP of the common electrode CE is preferably 1.5 μm or more and 5.5 μm or less. Also, the width of the opening OP of the common electrode CE is preferably 0.8 times or more and twice or less of the width of the pixel electrode PE. Also, in consideration of high-speed response and transmittance, the gap provided between the end portion of the opening OP and the end portion of the pixel electrode PE is ⅔ or less, preferably 1 or less, more preferably ½ or less of the thickness of the liquid crystal layer. In addition, the above gap is preferably ¼ or more of the thickness of the liquid crystal layer.

Note that, in the sub-pixel structure of the present embodiment, when the AC voltage driving method is considered, column inversion driving in which the sub-pixels in the Y-axis direction are alternately inverted to the positive polarity and the negative polarity is more advantageous than line inversion driving in which the sub-pixels in the X-axis direction are alternately inverted to the positive polarity and the negative polarity. The reason for this is that, in a high-definition display device, the number of lines is large, and a load such as power consumption in the display device is high, so that the line inversion driving is disadvantageous and column inversion driving is more advantageous.

According to the display device LCD of the present embodiment described above, it is possible to realize high transmittance with high definition. In particular, in the high-definition display device LCD, the transmittance can be increased by disposing the pixel electrode PE in the opening OP of the common electrode CE. As a result, the distance from the viewer's eyes to the display screen is small, and due to restrictions on arrangement of the pixel electrode, the display device LCD according to the present embodiment described above can be applied favorably to a display device LCD such as a head mount display HMD which is required to have high transmittance with high definition.

<Modification of Sub-Pixel Structure>

Figure 10A:
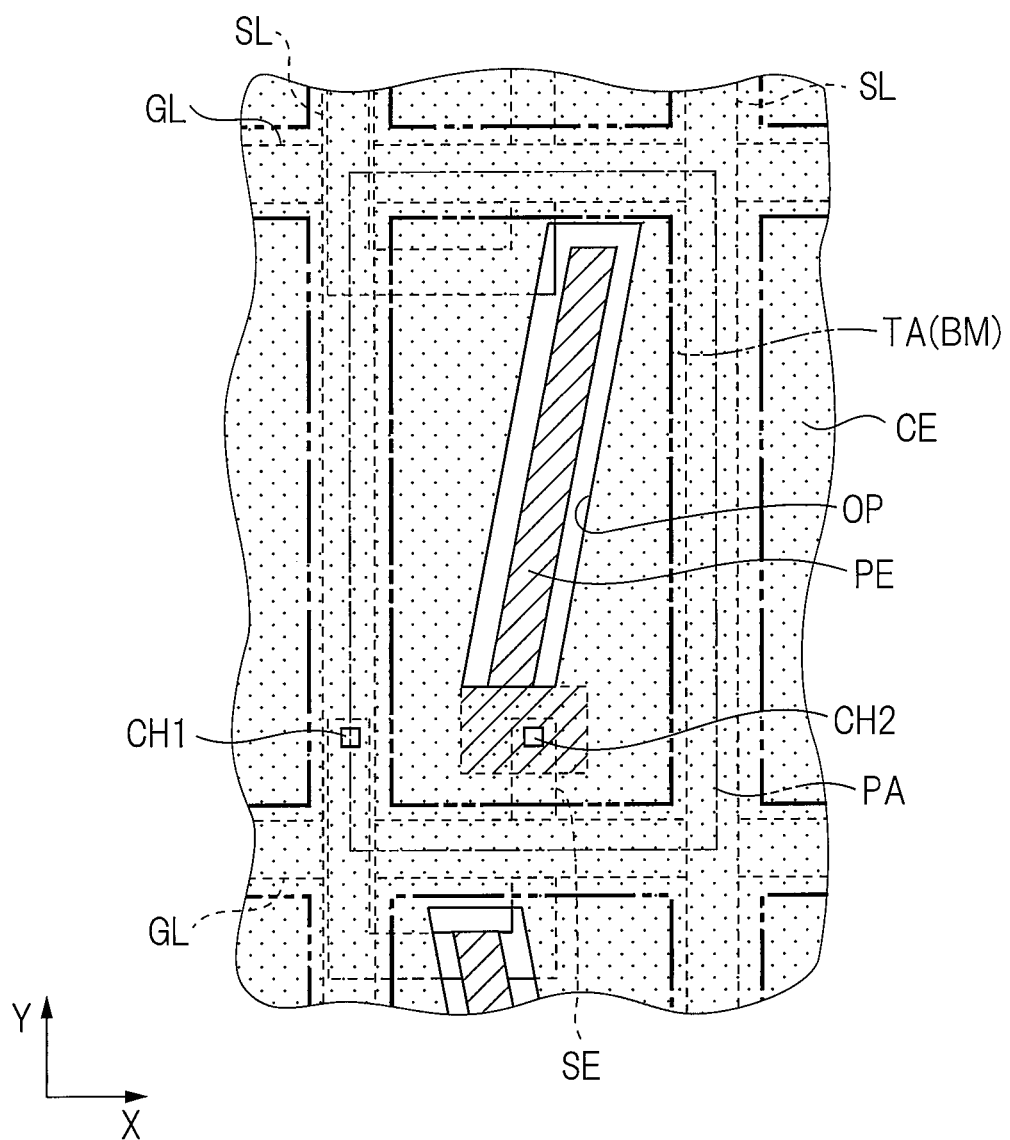
FIG. 10A is a plan view showing a modification example of the sub-pixel structure of the display device according to the embodiment.
Figure 10B:
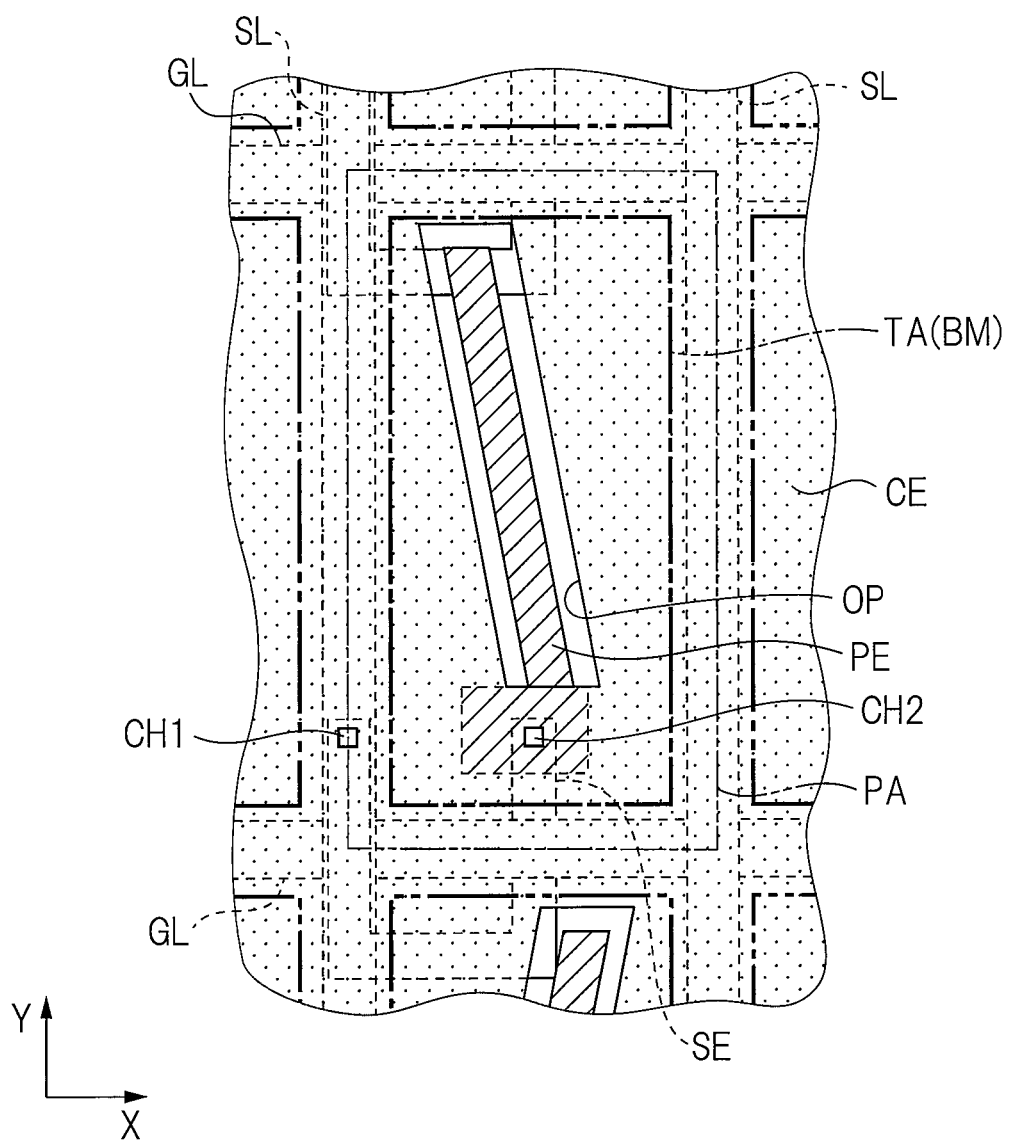
FIG. 10B is a plan view showing the modification example of the sub-pixel structure of the display device according to the embodiment.
Figure 11:
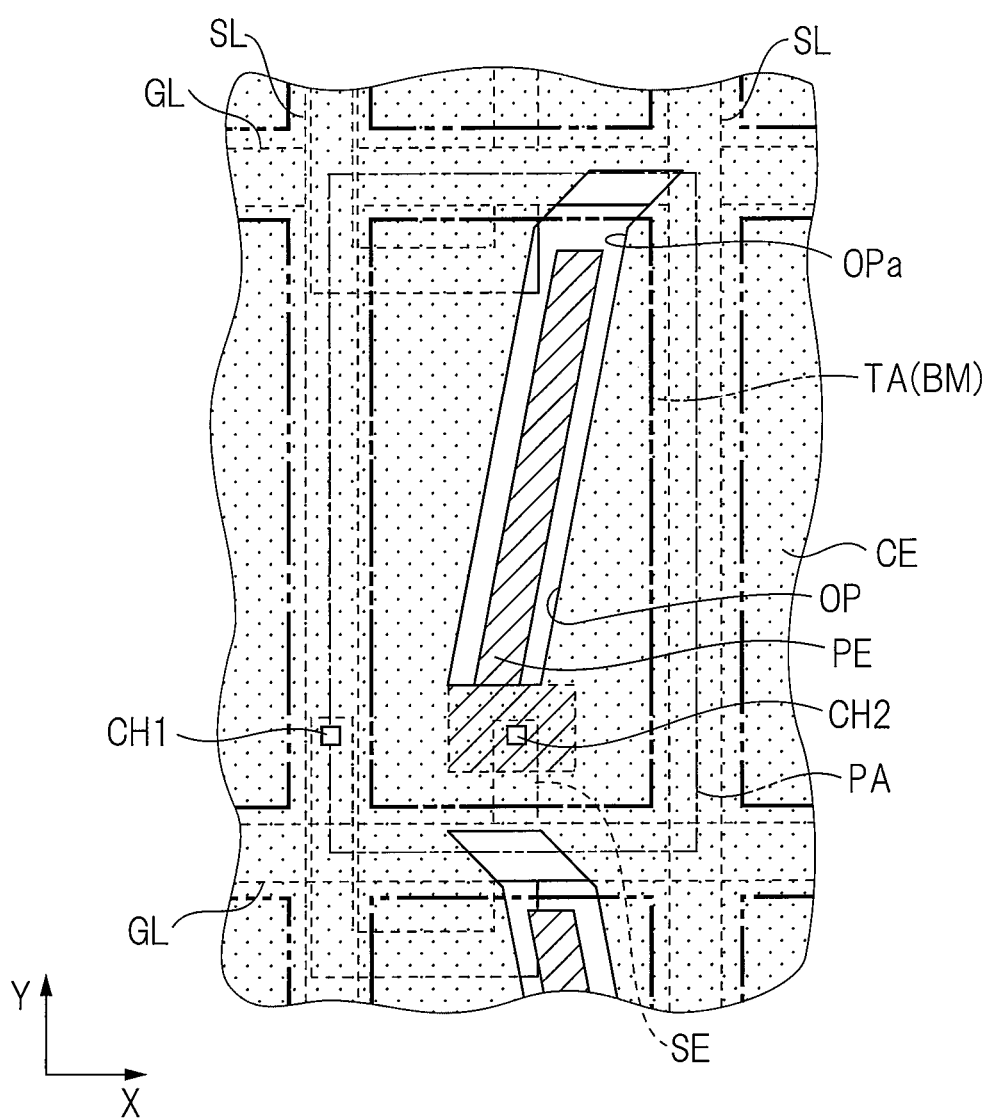
FIG. 11 is a plan view showing another modification example of the sub-pixel structure of the display device according to the embodiment.

Next, referring to FIG. 10A, FIG. 10B, and FIG. 11, a modification example of the sub-pixel structure will be described. FIG. 10A is a plan view showing a modification example of the sub-pixel structure of the display device LCD according to the embodiment. FIG. 10B is a plan view showing the modification example of the sub-pixel structure of the display device LCD according to the embodiment. FIG. 11 is a plan view showing another modification example of the sub-pixel structure of the display device LCD according to the embodiment. In this case, differences from the sub-pixel structure shown in FIG. 5 will be mainly described.

In the sub-pixel structure shown in FIG. 10A and FIG. 10B, the pixel electrode PE has a structure extending in a direction inclined with respect to the Y-axis direction in which the video line SL extends. In addition, the opening OP overlapping with the pixel electrode PE also has a shape extending in the direction inclined with respect to the Y-axis direction in which the video line SL extends.

FIG. 10A shows an example in which the pixel electrode PE and the opening OP are inclined in the right direction with respect to the Y-axis direction. In this case, each sub-pixel disposed in the X-axis direction with respect to the pixel shown in FIG. 10A also has a sub-pixel structure in which the pixel electrode PE and the opening OP are inclined in the right direction with respect to the Y-axis direction in the same manner. Conversely, each sub-pixel adjacent to the pixel shown in FIG. 10A in the Y-axis direction and disposed in the X-axis direction has a sub-pixel structure in which the pixel electrode PE and the opening OP are inclined in the left direction with respect to the Y-axis direction (FIG. 10B). In other words, when the X-axis direction is considered in each sub-pixel arrayed in a matrix in the X-axis direction and the Y-axis direction, for example, a sub-pixel structure is formed in which pixels connected to the odd-numbered scanning line GL are inclined in the right direction with respect to the Y-axis direction (FIG. 10A), and pixels connected to the even-numbered scanning line GL are inclined in the left direction with respect to the Y-axis direction (FIG. 10B).

In other words, the video line SL extends not along the end portion of the opening OP. In order to uniformly apply the electric field in the sub-pixel region, it is more favorable that the video line SL is also caused to extend along the end portion of the opening OP. However, when this structure is employed, the video line SL has a bent portion for each sub-pixel region. A width of the light shielding film BM corresponding to this bent portion needs to be formed large, and when the number of bent portions is large, an aperture ratio decreases. Therefore, in the high-definition display device like the present invention, it is more favorable not to bend the video line SL.

In the sub-pixel structure shown in FIG. 10A and FIG. 10B, domain countermeasures can be realized. That is, in the IPS mode, if there is a region in the sub-pixel where a direction of rotation of the liquid crystal molecule is different, a so-called domain is formed at a boundary between a region where the liquid crystal molecule rotates in a forward direction and a region where the liquid crystal molecule rotates in a reverse direction. In this domain, in general, a portion with low transmittance is generated in a stripe shape, or a portion with high transmittance is generated in a stripe shape, which adversely affects the brightness and the contrast of the screen. When the sub-pixel structure shown in FIG. 10 in which the pixel electrode PE is inclined in the Y-axis direction is employed, it is possible to prevent the rotation of the liquid crystal molecule in the reverse direction, so that occurrence of domains can be prevented.

In addition, when the pixel electrode PE is inclined in the Y-axis direction, a color of the transmitted light becomes slightly yellow or blue as compared with the case where the pixel electrode PE extends parallel to the Y-axis direction. However, when the structures of FIG. 10A and FIG. 10B are arranged to be adjacent to each other in the Y-axis direction, it is possible to cancel the phenomenon that the light changes in color to yellow or blue.

In the sub-pixel structure shown in FIG. 11, the pixel electrode PE has a structure extending in the direction (right direction) inclined with respect to the Y-axis direction in which the video line SL extends. Furthermore, the opening OP overlapping with the pixel electrode PE has a shape extending in the direction (right direction) inclined with respect to the Y-axis direction in which the video line SL extends and having a highly inclined portion OPa (bent portion) further bending in the inclined direction. The highly inclined portion OPa of this opening OP has a structure overlapping with the scanning line GL and the video line SL, but the highly inclined portion OPa of this opening may be a structure overlapping with only one of the scanning line GL and the video line SL. The highly inclined portion OPa of the opening OP has a structure that does not overlap with the pixel electrode PE.

Also in the sub-pixel structure shown in FIG. 11, when the X-axis direction is considered in each pixel arrayed in a matrix in the X-axis direction and the Y-axis direction, for example, a sub-pixel structure is formed in which pixels connected to the odd-numbered scanning line GL are inclined in the right direction with respect to the Y-axis direction, and pixels connected to the even-numbered scanning line GL are inclined in the left direction with respect to the Y-axis direction.

In the sub-pixel structure shown in FIG. 11, the highly inclined portion OPa serving as the domain countermeasure is formed only in the common electrode CE and not formed in the pixel electrode PE, so that a low transmittance region of a portion with low transmittance can be reduced. This makes it possible to further prevent occurrence of domains.

Other Embodiments

Figure 12:
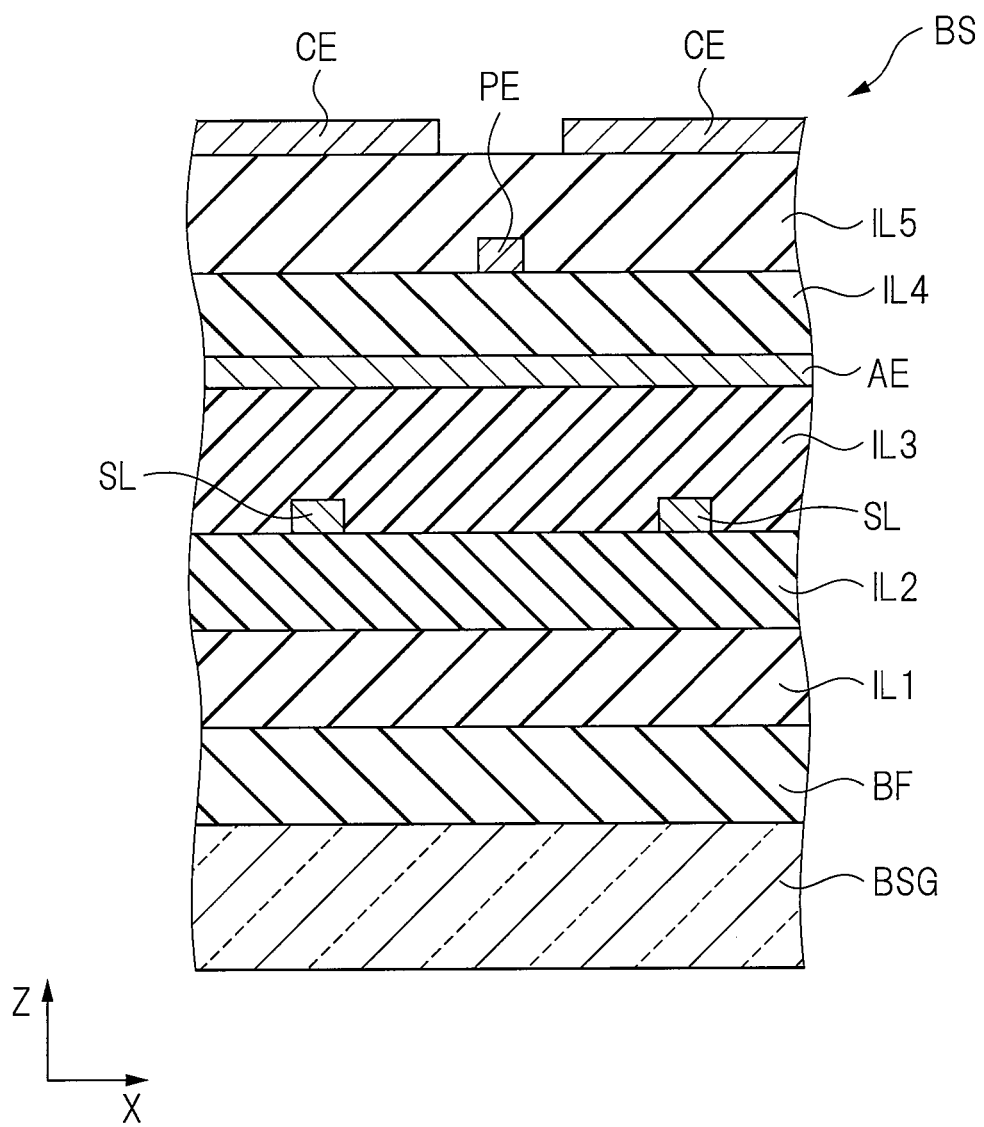
FIG. 12 is a cross-sectional view showing an example of the sub-pixel structure of the display device according to another embodiment.
Figure 13:
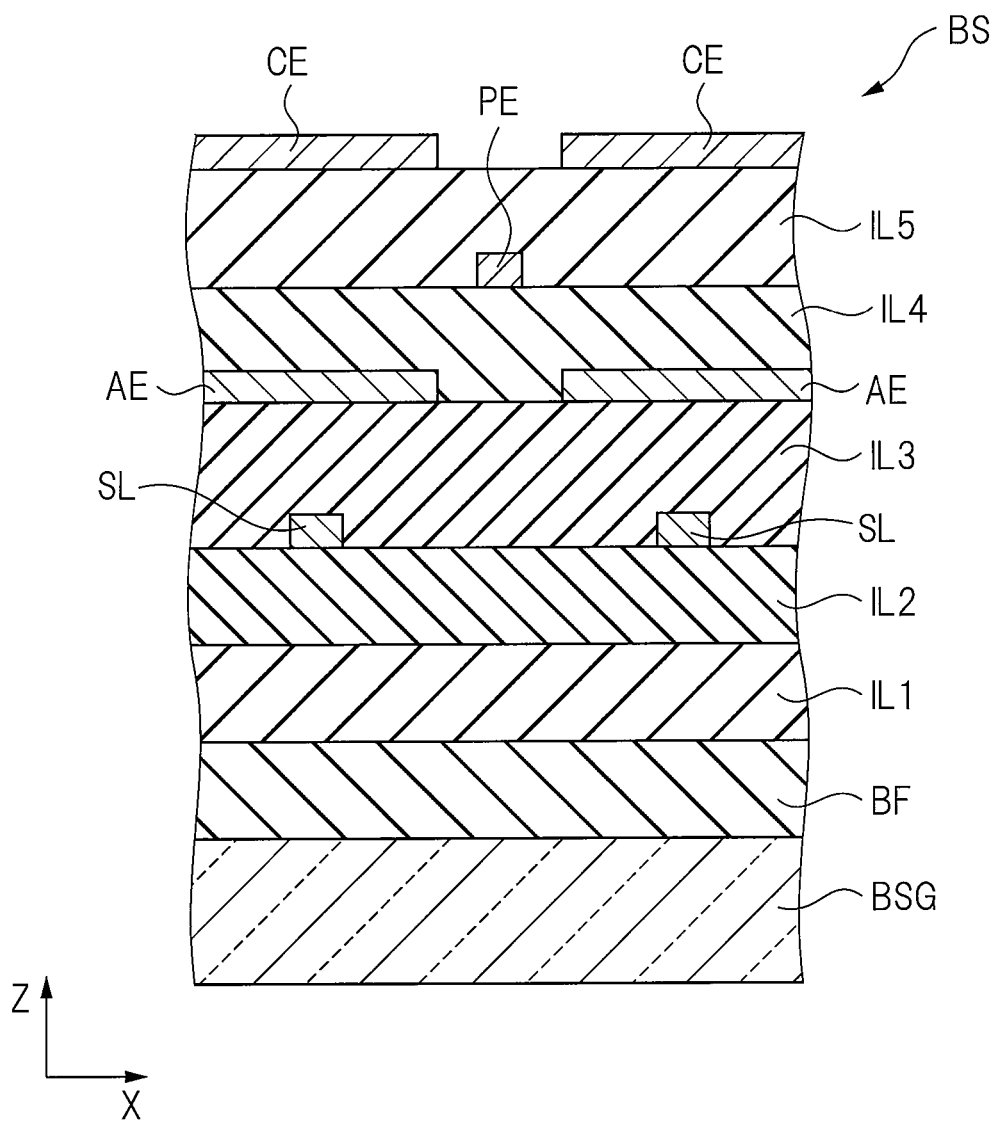
FIG. 13 is a cross-sectional view showing a modification example of the sub-pixel structure of the display device of FIG. 12.

Next, referring to FIG. 12 and FIG. 13, another embodiment will be described. FIG. 12 is a cross-sectional view showing an example of the sub-pixel structure of the display device LCD according to another embodiment. FIG. 13 is a cross-sectional view showing a modification example of the sub-pixel structure of the display device LCD of FIG. 12. FIG. 12 and FIG. 13 correspond to FIG. 6 of the above-described embodiment, and difference between the above-described embodiment and each of FIG. 12 and FIG. 13 will be mainly described.

A sub-pixel structure shown in FIG. 12 includes an insulating layer IL3 (second insulating layer) in contact with a plurality of video lines SL and covering the plurality of video lines SL, and an auxiliary electrode AE (third electrode) provided between the insulating layer IL3 and a layer formed with the pixel electrode PE (first electrode). That is, the array substrate BS has, for example, a base film BF and insulating layers IL1 to IL5 over an insulating base material BSG.

In the array substrate BS, the base film BF, the insulating layer IL1 provided with the semiconductor layer SE, the insulating layer IL2 provided with the scanning line GL, and the insulating layer IL3 provided with the video line SL are formed in this order over the insulating base material BSG. Further, on the insulating layer IL3, an auxiliary electrode AE is provided. The auxiliary electrode AE is covered with an insulating layer IL4. On the insulating layer IL4, a pixel electrode PE is provided. The pixel electrode PE is covered with the insulating layer IL5. On the insulating layer IL5, the common electrode CE is provided.

The sub-pixel structure shown in FIG. 12 has a structure in which the common electrode CE is located in the upper layer (on the liquid crystal layer LCL side) with respect to the pixel electrode PE and the auxiliary electrode AE is located in the lower layer (on the opposite side of the liquid crystal layer LCL) with respect to the pixel electrode PE. Furthermore, the pixel electrode PE and the common electrode CE are arranged so as not to overlap with each other, and the auxiliary electrode AE overlaps with the pixel electrode PE and the common electrode CE. That is, the common electrode CE has an opening OP so as not to overlap with the pixel electrode PE, and the auxiliary electrode AE has a solid pattern so as to overlap with the pixel electrode PE and the common electrode CE. In this sub-pixel structure, the auxiliary electrode AE forms an electric field between the auxiliary electrode AE and the pixel electrode PE.

In the sub-pixel structure shown in FIG. 12, the same effects as the above-described embodiment are achieved, and in addition, since the auxiliary electrode AE is provided, the electric field is formed also between the auxiliary electrode AE and the pixel electrode PE, and capacitance between the auxiliary electrode AE and the pixel electrode PE increases. This is advantageous in terms of electric field formation and auxiliary capacitance. In the sub-pixel structure shown in FIG. 12, as a result of the simulation, the brightness was substantially the same as that in the above-mentioned embodiment, which was 1.013.

In the sub-pixel structure shown in FIG. 13, the pixel electrode PE and the common electrode CE are arranged so as not to overlap with each other, and the auxiliary electrode AE is also arranged so as not to overlap with the pixel electrode PE. That is, the common electrode CE and the auxiliary electrode AE each have the structure having the opening OP so as not to overlap with the pixel electrode PE. In addition, also in this sub-pixel structure, the auxiliary electrode AE forms the electric field between the auxiliary electrode AE and the pixel electrode PE.

In the sub-pixel structure shown in FIG. 13, although capacitance between the auxiliary electrode AE and the pixel electrode PE cannot be increased, the electric field can also be formed between the auxiliary electrode AE and the pixel electrode PE, and therefore, the sub-pixel structure shown in FIG. 13 is advantageous in terms of electric field formation. In the sub-pixel structure shown in FIG. 13, as a result of the simulation, the brightness was substantially the same as that in the above-mentioned embodiment, which was 1.014.

Figure 19:
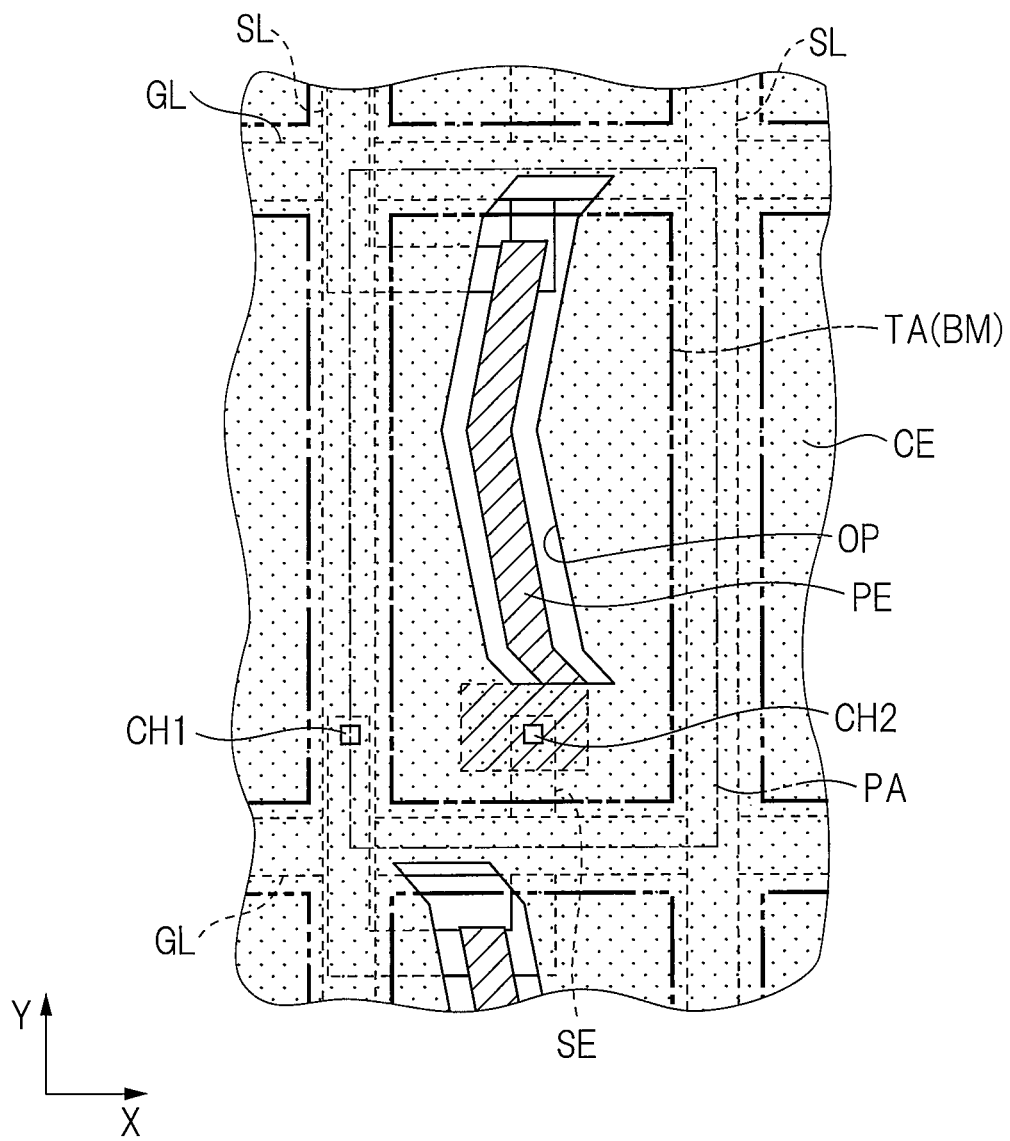
FIG. 19 is a plan view showing still another modification example of the sub-pixel structure of the display device according to the embodiment.

Note that the domain countermeasure structure shown in FIG. 10A and FIG. 10B may be a domain countermeasure structure shown in FIG. 19. FIG. 19 is a plan view showing still another modification example of the sub-pixel structure of the display device according to the embodiment. FIG. 10A and FIG. 10B are the domain countermeasure structures using two sub-pixel structures adjacent to each other in the Y-axis direction. FIG. 19 is a domain countermeasure structure using one sub-pixel structure. For the domain countermeasures, it is important that the pixel electrode PE is inclined, but in the case of a display device with high definition, a structure where the width of the sub-pixel region becomes small and the video line SL is not bent is formed. In this case, using the pixel electrode like FIG. 10A or FIG. 10B, there is a risk that the electric field near the end portion of the pixel electrode may drive the liquid crystal of the adjacent pixel region. However, as shown in FIG. 19, if the pixel electrode PE has a bent portion, the influence of the pixel electrode PE on the adjacent pixel can be reduced.

Note that, as shown in FIG. 19, the opening OP, the pixel electrode PE, and the semiconductor layer SE overlap with one another in order to dispose the opening OP at the center in the sub-pixel region. A vicinity of the semiconductor layer SE is a region where light of the backlight is difficult to transmit, and therefore, an upper part of the semiconductor layer SE is defined as a formation region of the pixel electrode PE. As indicated in FIG. 8, the region of the pixel electrode PE is a region where the electric field is weak. By causing this region to overlap with the semiconductor layer SE, the transmittance of the entire sub-pixel region is improved.

Figure 20:
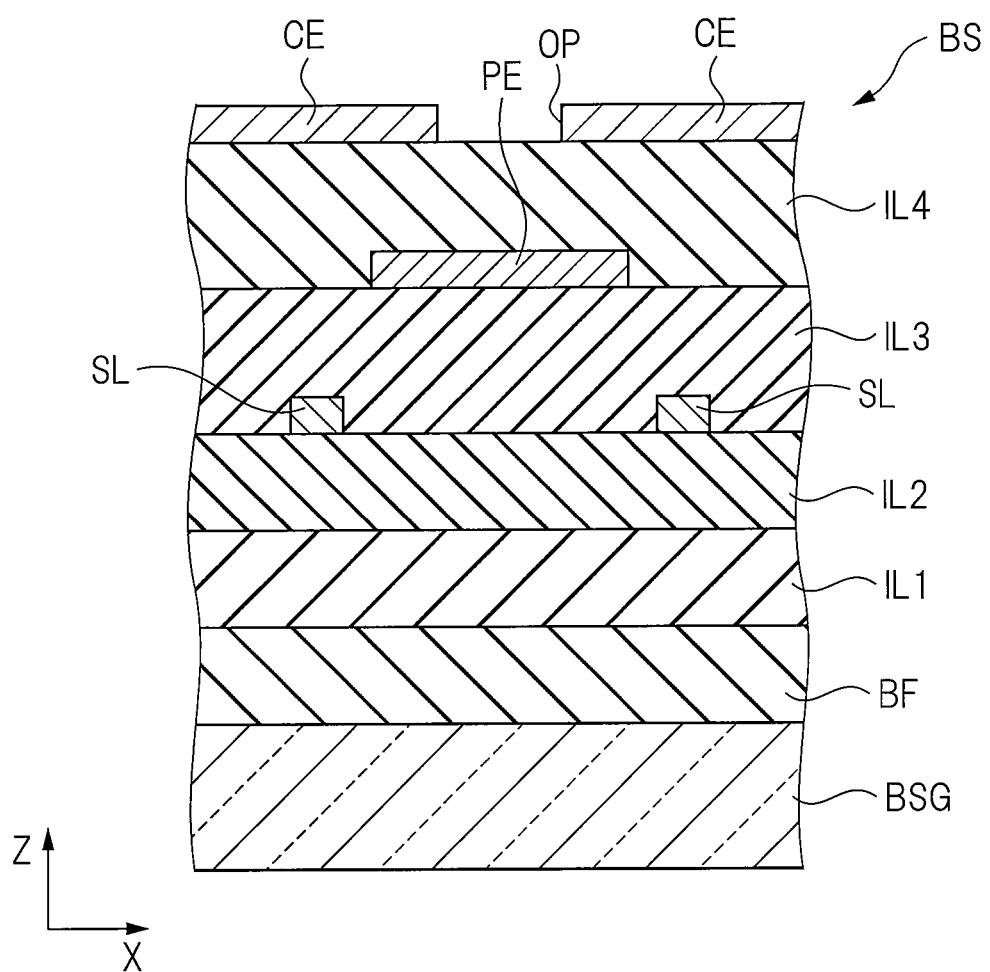
FIG. 20 is a cross-sectional view showing yet another modification example of the sub-pixel structure of the display device according to the embodiment.

Also, for the capacitance formation with the common electrode CE, the shape of the pixel electrode PE of FIG. 6 may partially overlap with the common electrode CE like FIG. 20. FIG. 20 is a cross-sectional view showing yet another modification example of the sub-pixel structure of the display device according to the embodiment. However, the transmittance may decrease if the number of the pixel electrodes PE is too large. Therefore, it is preferable that a width where the common electrode CE and the pixel electrode PE do not overlap with each other is large.

Figure 21:
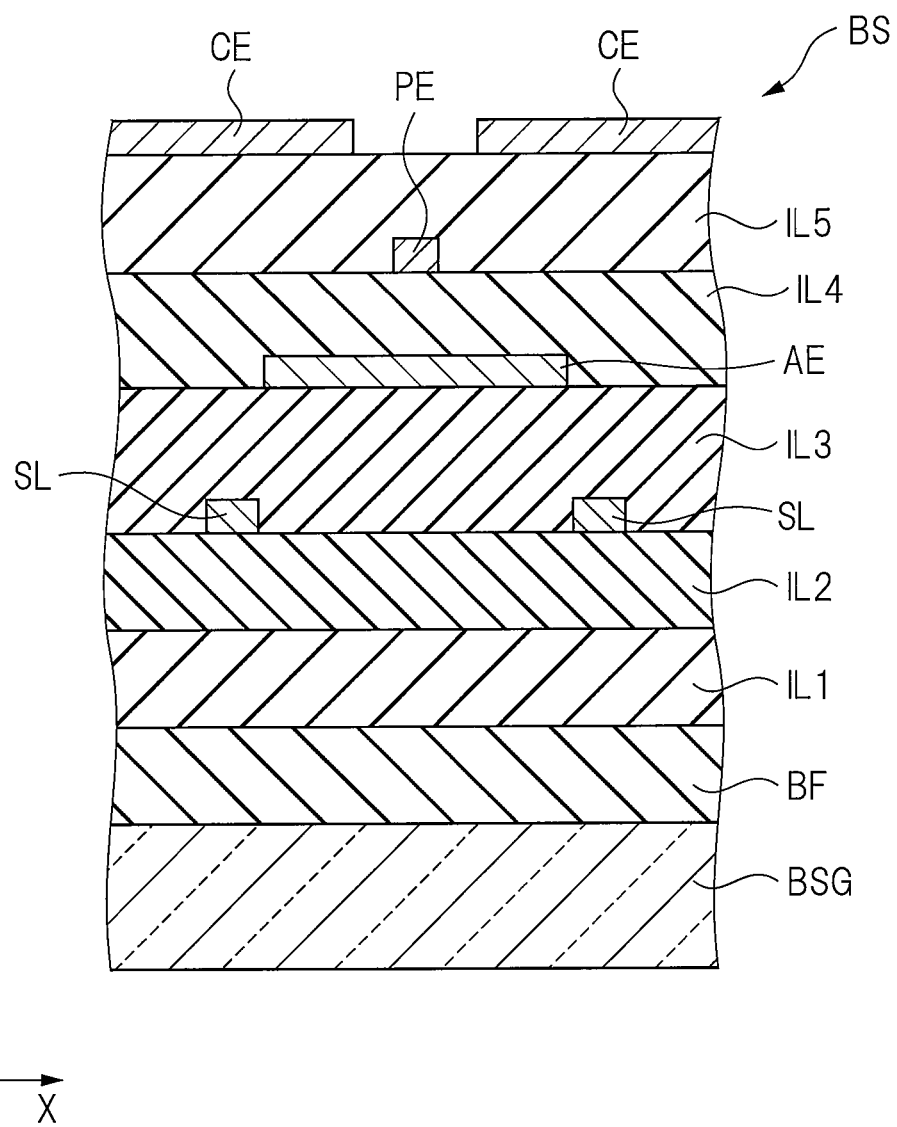
FIG. 21 is a cross-sectional view showing a further modification example of the sub-pixel structure of the display device according to the embodiment.

Also, in view of the transmittance in the sub-pixel region and capacitance formation with the pixel electrode, the shape of the auxiliary electrode AE in FIG. 12 may be a shape partially overlapping with the common electrode CE like FIG. 21. FIG. 21 is a cross-sectional view showing further modification example of the sub-pixel structure of the display device according to the embodiment.

In the foregoing, the invention made by the inventor of the present invention has been concretely described based on the embodiments. However, it is needless to say that the present invention is not limited to the foregoing embodiments and various modifications and alterations can be made within the scope of the present invention.

Various modifications and alterations can be conceived by those skilled in the art within the spirit of the present invention, and it is understood that such modifications and alterations are also encompassed within the scope of the present invention.

For example, those skilled in the art can suitably modify the above-described embodiment by addition, deletion, or design change of components, or by addition, omission, or condition change of steps. Such modifications are also encompassed within the scope of the present invention as long as they include the gist of the present invention.

What is claimed is:

1. A display device comprising:
an insulating base material;
a plurality of video lines and a plurality of scanning lines provided over the insulating base material;
a light shielding film overlapping with the plurality of video lines and the plurality of scanning lines;
a first electrode and a second electrode provided in a sub-pixel region surrounded by the plurality of video lines and the plurality of scanning lines in plan view;
a transistor electrically connected to the first electrode through a contact hole;
a liquid crystal layer driven by an electric field generated between the first electrode and the second electrode; and
a first insulating layer provided between the first electrode and the second electrode,
wherein the insulating base material, the first electrode, the first insulating layer, the second electrode, and the liquid crystal layer are disposed in this order,
wherein the second electrode overlaps with the plurality of video lines and the plurality of scanning lines, and has an opening overlapping with the first electrode,
wherein, in a light transmission region surrounded by the light shielding film, the first electrode has a linear shape portion without a branching portion, a main part of the linear shape portion being disposed within the opening and the main part being over half of the linear shape portion,
wherein the opening does not overlap the contact hole, and
wherein a width of the opening is larger than a width of the linear shape portion in a direction intersecting an extending direction of the linear shape portion.

2. The display device according to claim 1, wherein a width of the sub-pixel region is 13 μm or less.

3. The display device according to claim 1, wherein the first electrode is a pixel electrode, and the second electrode is a common electrode formed over a plurality of the sub-pixel regions.

4. The display device according to claim 1, wherein, in the light transmission region, the first electrode and the second electrode do not overlap with each other.

5. The display device according to claim 1, comprising:
a transistor electrically connected to the first electrode and having a semiconductor layer,
wherein the opening, the first electrode, and the semiconductor layer overlap with one another.

6. The display device according to claim 5, wherein the opening has a bent portion, and
wherein the bent portion and the first electrode do not overlap with each other.

7. The display device according to claim 1, wherein the video line extends in a first direction, and the first electrode extends in a direction inclined to the first direction.

8. The display device according to claim 1, wherein, in plan view, a gap is provided between an end portion of the first electrode and an end portion of the second electrode, and
wherein the gap is smaller than a width of the first electrode.

9. The display device according to claim 1, wherein a width of the first electrode is 1/6 or more and 1/3 or less of a width of the sub-pixel region, and
wherein a width of the opening is 0.8 times or more and twice or less of the width of the first electrode.

10. The display device according to claim 1, wherein, in plan view, a gap is provided between an end portion of the first electrode and an end portion of the second electrode, and
wherein a distance of the gap in plan view is 1/4 or more and 3/2 or less with respect to a thickness of the liquid crystal layer.

11. The display device according to claim 1,
wherein the display device is used for a head mount display.

12. The display device according to claim 2,
wherein the first electrode is a pixel electrode, and the second electrode is a common electrode formed over a plurality of the sub-pixel regions.

13. The display device according to claim 2,
wherein, in the light transmission region, the first electrode and the second electrode do not overlap with each other.

14. The display device according to claim 3,
wherein, in the light transmission region, the first electrode and the second electrode do not overlap with each other.

15. The display device according to claim 2, comprising:
a transistor electrically connected to the first electrode and having a semiconductor layer,
wherein the opening, the first electrode, and the semiconductor layer overlap with one another.

16. The display device according to claim 3, comprising:
a transistor electrically connected to the first electrode and having a semiconductor layer,
wherein the opening, the first electrode, and the semiconductor layer overlap with one another.

17. The display device according to claim 4, comprising:
a transistor electrically connected to the first electrode and having a semiconductor layer,
wherein the opening, the first electrode, and the semiconductor layer overlap with one another.

\* \* \* \* \*